United States Patent
Mathew et al.

(10) Patent No.: US 12,190,156 B2
(45) Date of Patent: *Jan. 7, 2025

(54) AUTONOMOUS RELEASE MANAGEMENT IN DISTRIBUTED COMPUTING SYSTEMS

(71) Applicant: Sedai Inc., Pleasanton, CA (US)

(72) Inventors: Suresh Mathew, San Ramon, CA (US); Nikhil Gopinath Kurup, Tampa, FL (US); Hari Chandrasekhar, Highlands Ranch, CO (US); Benjamin Thomas, San Jose, CA (US); Rajat Usha Krishna, Trivandrum (IN); Adharsh Sabukumar, Trivandrum (IN); S Meenakshi, Eranakulam (IN); Aby Jacob, Trivandrum (IN)

(73) Assignee: SEDAI INC., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/110,412

(22) Filed: Feb. 16, 2023

(65) Prior Publication Data

US 2023/0205586 A1    Jun. 29, 2023

Related U.S. Application Data

(63) Continuation of application No. 17/464,987, filed on Sep. 2, 2021, now Pat. No. 11,593,100.

(Continued)

(51) Int. Cl.
*G06F 8/71* (2018.01)
*G06F 9/50* (2006.01)
(Continued)

(52) U.S. Cl.
CPC .............. *G06F 9/5016* (2013.01); *G06F 8/71* (2013.01); *G06F 9/5094* (2013.01);
(Continued)

(58) Field of Classification Search
None
See application file for complete search history.

(56) References Cited

U.S. PATENT DOCUMENTS

| 6,195,795 | B1 * | 2/2001 | Block | G06F 8/71 |
| | | | | 707/999.203 |
| 7,600,219 | B2 * | 10/2009 | Tsantilis | G06F 8/71 |
| | | | | 707/999.203 |

(Continued)

FOREIGN PATENT DOCUMENTS

EP    20189958.0    *    8/2020

*Primary Examiner* — Marina Lee
(74) *Attorney, Agent, or Firm* — YANTRA PATENTS LLC; Anand P. Narayan

(57) ABSTRACT

Implementations described herein relate to methods, systems, and computer-readable media to provide an alert based on a release of a software application implemented in a distributed computing system. In some implementations, the method includes receiving, at a processor, an indication of the release of the software application, obtaining a first set of metric values for each metric of a list of metrics for a first time period preceding a time of release of the release, obtaining a second set of metric values for each metric of the list of metrics for a second time period following the time of release, comparing the first set of metric values to the second set of metric values to determine a deviation score, generating an alert based on the deviation score, and transmitting the alert via one of a user interface and a communication channel.

18 Claims, 12 Drawing Sheets

Related U.S. Application Data

(60) Provisional application No. 63/214,783, filed on Jun. 25, 2021, provisional application No. 63/214,784, filed on Jun. 25, 2021.

(51) Int. Cl.
| | | |
|---|---|---|
| *G06F 11/07* | (2006.01) | |
| *G06F 11/30* | (2006.01) | |
| *G06F 11/34* | (2006.01) | |
| *G06N 3/08* | (2023.01) | |
| *G08B 21/18* | (2006.01) | |
| *H04L 43/16* | (2022.01) | |
| *H04L 67/00* | (2022.01) | |
| *H04L 67/10* | (2022.01) | |

(52) U.S. Cl.
CPC ...... *G06F 11/0721* (2013.01); *G06F 11/0769* (2013.01); *G06F 11/079* (2013.01); *G06F 11/3006* (2013.01); *G06F 11/34* (2013.01); *G06F 11/3452* (2013.01); *G06N 3/08* (2013.01); *G08B 21/182* (2013.01); *H04L 43/16* (2013.01); *H04L 67/10* (2013.01); *H04L 67/34* (2013.01); *G06F 2209/501* (2013.01)

(56) References Cited

U.S. PATENT DOCUMENTS

| | | | |
|---|---|---|---|
| 9,356,883 B1* | 5/2016 | Borthakur | H04L 41/5025 |
| 11,150,898 B1* | 10/2021 | Kesiboyana | G06Q 10/06398 |
| 11,269,616 B1* | 3/2022 | Schumaker | G06F 8/65 |
| 11,775,346 B2* | 10/2023 | Mathew | H04L 67/34 |
| | | | 714/38.1 |
| 2005/0278703 A1* | 12/2005 | Lo | G06F 11/0709 |
| | | | 717/169 |
| 2017/0311897 A1* | 11/2017 | Faccioli | A61B 5/7203 |
| 2018/0121322 A1* | 5/2018 | Reyes | G06F 11/3616 |
| 2019/0303118 A1* | 10/2019 | Avinash Dorle | H04L 41/16 |
| 2019/0312800 A1* | 10/2019 | Schibler | H04L 41/0869 |
| 2019/0317754 A1* | 10/2019 | Mosquera | G06F 8/77 |
| 2020/0081814 A1* | 3/2020 | Srinivasan | G06F 8/71 |
| 2021/0081298 A1* | 3/2021 | Gardner | G06F 11/3452 |
| 2022/0413991 A1* | 12/2022 | Kyle | G06F 11/3409 |
| 2023/0286541 A1* | 9/2023 | Tescher | G06F 8/71 |

* cited by examiner

470 → Performance metric

475 → Metric name: Function Latency

480 → Metric identifier:X34567ZZB

Infrastructure provider:AWS

Monitoring provider for metric:DataPeek

Metric Type:Latency

Data Type:Number

Metric scope:Application Specific

Auto-remediate:Yes

Detection Threshold:20ms

Notes:

FIG. 4C

AUTONOMOUS RELEASE MANAGEMENT IN DISTRIBUTED COMPUTING SYSTEMS

CROSS-REFERENCE TO RELATED APPLICATIONS

This application is a continuation of U.S. patent application Ser. No. 17/464,987, filed 2 Sep. 2021, titled "AUTONOMOUS RELEASE MANAGEMENT IN DISTRIBUTED COMPUTING SYSTEMS," now U.S. Pat. No. 11,593,100, which claims priority to U.S. Provisional Patent Application No. 63/214,783, filed 25 Jun. 2021, titled "AUTONOMOUS MANAGEMENT OF COMPUTING SYSTEMS" and to U.S. Provisional Patent Application No. 63/214,784, filed 25 Jun. 2021, titled "CLOUD MANAGEMENT SYSTEM WITH AUTONOMOUS ABERRANT BEHAVIOR DETECTION." The contents of the above-referenced applications are incorporated by reference herein in their entirety.

TECHNICAL FIELD

Embodiments relate generally to autonomous management of releases of software applications in distributed computing systems.

BACKGROUND

Some computer systems utilize distributed architectures, e.g., cloud-based systems to host applications. The applications may be hosted across multiple computer systems that are operated by different service providers, and in many cases, using a variety of computing devices.

Modern software development commonly follows a continuous integration and continuous delivery/continuous deployment (CI/CD) methodology, in which incremental code changes are made frequently, often by small teams and released for deployment after testing using a suitable test deployment. While testing is performed prior to the release at a local level, there are challenges in testing the release within a full production environment, where unanticipated problems and/or issues may still be encountered.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method to provide an alert for a release of a software application implemented in a distributed computing system. The computer—implemented method also includes obtaining a first set of metric values for a first time period preceding a time of release of the release, where the first set of metric values includes pre-release metric values for a plurality of metrics associated with the software application; obtaining a second set of metric values for a second time period following the time of release, where the second set of metric values includes post-release metric values for the plurality of metrics associated with the software application, and where the second set of metrics includes at least one traffic volume metric; predicting a state of one or more metrics included in the plurality of metrics for the second time period, where the predicting is based on the first set of metric values for the first time period and the at least one traffic volume metric; determining a current state of the one or more metrics for the second time period based on the second set of metric values; determining a deviation score based on a difference between the predicted state of the one or more metrics and the respective current state of the one or more metrics; generating an alert based on the deviation score meeting a predetermined threshold; and transmitting the alert via one of: a user interface and a communication channel. Other embodiments of this aspect include corresponding computer systems, apparatus, and computer programs recorded on one or more computer storage devices, each configured to perform the actions of the methods.

Implementations may include one or more of the following features. The method of predicting the state of the one or more metrics may include predicting the state of the one or more metrics based on a plurality of previous states of the one or more metrics for the first time period. Obtaining the first set of metric values may include obtaining time-series data associated with the software application. Obtaining the time-series data may include querying a database at a periodic interval. The method may include, automatically detecting, by a machine agent, the release of the software application based on detection of one or more of an updated build time, an updated code image size, and an updated build version of the software application. The method may include receiving a notification of the release of the software application from a release management system. The method may include determining a duration of the first time period based on statistical properties of the one or more metrics. Determining the predicted state of the one or more metrics further may include applying a time series forecasting model based on a plurality of previous states of each of the one or more metrics from the first time period. Applying the time series forecasting model may include applying an autoregressive integrated moving average (arima) model, and where a number of the plurality of previous states is between about 3 previous states and about 20 previous states. Determining the deviation score may include determining a first deviation score of a first metric and a second deviation score of a second metric. The method may include determining a composite deviation score based on a weighted combination of the first deviation score and the second deviation score. Predicting the state of the one of more metrics may include determining the state of the one or more metrics based on:

$$Mt = \sum_{m=1}^{j} \sum_{n=1}^{k} f_m(M_{t-n}, T_{t-n}),$$

where $m_t$ is a value of a particular metric m at time t, and $T_t$ is a value of a traffic volume T at time t. The method may include performing release analysis to determine dependencies of the software application during the first time period and the second time period. The method may include transmitting one of a notification or an alert that includes results of the release analysis. Implementations of the described techniques may include hardware, a method or process, or computer software on a computer-accessible medium.

The non-transitory computer-readable medium also includes obtaining a first set of metric values for a first time period preceding a time of release of release of a software application, where the first set of metric values includes pre-release metric values for a plurality of metrics associated with the software application; obtaining a second set of metric values for a second time period following the time of release, where the second set of metric values includes post-release metric values for the plurality of metrics associated with the software application, and where the second set of metrics includes at least one traffic volume metric; predicting a state of one or more metrics included in the plurality of metrics for the second time period, where the predicting is based on the first set of metric values for the first time period and the at least one traffic volume metric; determining a current state of the one or more metrics for the second time period based on the second set of metric values; determining a deviation score based on a difference between the predicted state of the one or more metrics and the respective current state of the one or more metrics; generating an alert based on the deviation score meeting a predetermined threshold; and transmitting the alert via one of: a user interface and a communication channel. Other embodiments of this aspect include corresponding computer systems, apparatus, and computer programs recorded on one or more computer storage devices, each configured to perform the actions of the methods.

Implementations may include one or more of the following features. The non-transitory computer-readable medium utilized for predicting the state of the one or more metrics may include predicting the state of the one or more metrics based on a plurality of previous states of the one or more metrics for the first time period. Implementations of the described techniques may include hardware, a method or process, or computer software on a computer-accessible medium.

The system also includes a memory with instructions stored thereon; and a processing device, coupled to the memory, the processing device configured to access the memory and execute the instructions, where the instructions cause the processing device to perform operations including: obtaining a first set of metric values for a first time period preceding a time of release of release of a software application, where the first set of metric values includes pre-release metric values for a plurality of metrics associated with the software application; obtaining a second set of metric values for a second time period following the time of release, where the second set of metric values includes post-release metric values for the plurality of metrics associated with the software application, and where the second set of metrics includes at least one traffic volume metric; predicting a state of one or more metrics included in the plurality of metrics for the second time period, where the predicting is based on the first set of metric values for the first time period and the at least one traffic volume metric; determining a current state of the one or more metrics for the second time period based on the second set of metric values; determining a deviation score based on a difference between the predicted state of the one or more metrics and the respective current state of the one or more metrics; generating an alert based on the deviation score meeting a predetermined threshold; and transmitting the alert via one of: a user interface and a communication channel. Other embodiments of this aspect include corresponding computer systems, apparatus, and computer programs recorded on one or more computer storage devices, each configured to perform the actions of the methods.

Implementations may include one or more of the following features. The system where the operations may include obtaining a third set of metric values for a third time period following the time of release. Obtaining a third set of metric values for a third time period may include obtaining data for the third time period based on a determination that a traffic metric for the third time period meets a predetermined threshold. Obtaining the second set of metric values for a second time period may include obtaining the second set of metric values for a second time period for a time period that commences following a predetermined time after the time of release of the software application. Implementations of the described techniques may include hardware, a method or process, or computer software on a computer-accessible medium.

BRIEF DESCRIPTION OF THE DRAWINGS

FIG. 4C depicts an example performance metric record utilized in monitoring a distributed computing system, in accordance with some implementations

DETAILED DESCRIPTION

Figure 1:
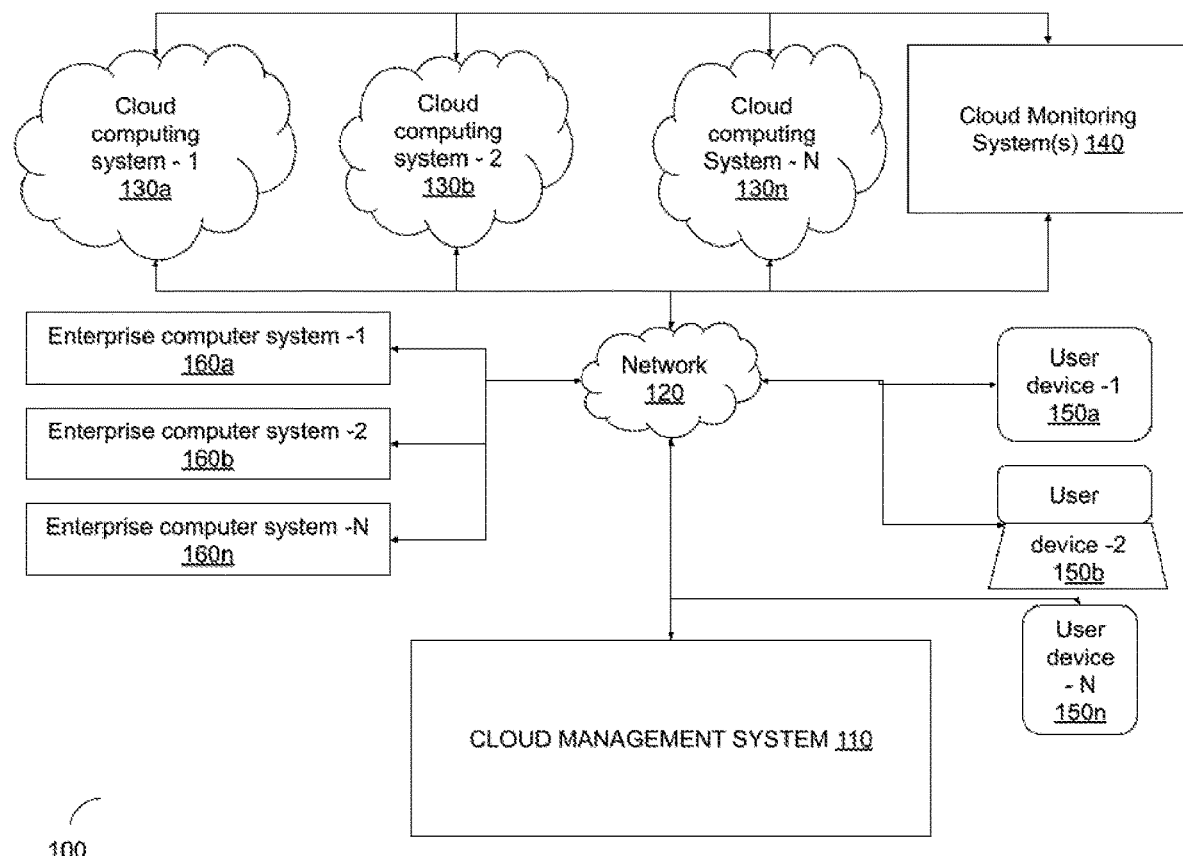
FIG. 1 is a diagram of an example distributed computing environment, in accordance with some implementations.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some embodiments", "an embodiment", "an example embodiment", etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be implemented in connection with other embodiments whether or not explicitly described.

Today's extremely competitive global market calls for a high degree of business agility and responsiveness to customer needs and tastes. The introduction rate of new features via software releases has steadily increased to meet ever-evolving customer needs, and innovative computing architectures such as cloud native microservice architectures are becoming the new norm. Releases have risen to hundreds per month with a consequent impact on the roles and responsibilities of Site Reliability Engineers (SRE) who are tasked with managing the computing environment.

Technical outages to computing systems can have significant business implications. For example, Costco warehouse, with over 98.6 million members, had one of its biggest outages on Thanksgiving Day in 2019, impacting close to 2.6 million of its customers and causing more than $11 million in losses. On the same day, Home Depot, H&M, and Nordstrom customers too reported issues with their e-commerce sites. According to the Information Technology Industry Council (ITIC), 86% of the companies estimate that an hour of downtime can cause a greater than $300,000 revenue loss, and for 34% of companies, anywhere from $1 to $5 million.

RetailTouchPoints reported that for Black Friday shoppers specifically, nearly half of consumers (49%) say they will abandon their cart if they receive any error message during checkout that prevents them from completing their purchase. Shoppers who have to wait six seconds are 50% less likely to make a purchase, and 33% of shoppers will visit a competitor if the site they are currently on is slow to load.

For more critical services like health care, the stakes are much higher. Dexcom, a leader in continuous glucose monitoring systems, had a service outage for more than 24 hours, which resulted in irate customers and lives at risk.

With businesses increasingly earning larger revenue shares from online commerce, CTOs and SRE organizations are under tremendous pressure to achieve high levels of site availability at the most optimal costs—all while satisfying ever-increasing regulatory pressures.

In the pre-DevOps/Cloud era, monolithic services designed site architectures for product and software releases once or twice a year. However, businesses' modern needs now dictate faster responses to market signals. With the advent of cloud technology and simultaneous services segmentation, product features can be released quicker than ever—sometimes more than 50 times per year. But alongside an increased churn rate for features and versions comes elevated management costs.

Cloud adoption, virtualization, and DevOps maturity have led to agile deployment strategies and reduced time to market (TTM), which allows businesses to compete more effectively. Automation played a vital role on the road to achieving agile deployment—processes transitioned from being imperatively managed by a set of system administrators with command line interface, to being declaratively managed by a much smaller team of administrators in a distributed framework.

Organizations commonly utilize multiple cloud providers to implement their computing solutions. For example, an organization may utilize offerings from one or more providers, e.g., Amazon Web Services (AWS), Google Cloud Platform (GCP), Microsoft Azure etc., to implement their solution architecture. Metrics associated with their solution architecture and applications running over their architecture may be provided by multiple monitoring providers.

A typical software product implemented via a microservices based architecture may include hundreds of underlying applications. For example, a money transfer application may include multiple microservices operating using a combination of parallel and sequential processes, e.g., a client login microservice, a pre-validation check microservice, a microservice that performs funds availability verification, a risk analysis microservice to investigate fraud or other unauthorized transaction, etc.

Each microservice may be executed by a different code set, implemented and managed by different teams, with their own development cycles, releases, etc. Each of the microservices may utilize its own metric or set of metrics to monitor performance and health of the microservice and/or application.

During run-time, issues and problems may occur at any of multiple levels, e.g., runtime errors or performance issues caused by code issues due to a new release, integration issues of a particular microservice with other microservices, integration issues with third party providers, network issues, hardware issues, etc.

Anomalies and/or problems observed in distributed computing systems can be roughly divided into three categories: Early Failures, Random Failures, and Late Failures. The increased pace of software development, and a higher frequency of releases of software applications, e.g., using an Agile or other development framework, leads to an increase in Early Failures. This commonly happen as a side effect of the velocity of innovation, such as the newness of an application. When an application starts to mature, the frequency of failures goes down. Techniques of this disclosure can mitigate early failures by automatically analyzing new releases in the production environment, before the effects spread widely through a distributed computing system. Predictive scaling of new releases of software applications is performed based on early and intelligence release analysis.

This disclosure describes a cloud management platform to autonomously monitor distributed computer systems and their input metric settings, detect abnormal system behavior and anomalies, and autonomously generate alerts and recommendations. In some implementations, autonomous remediation may be undertaken by the cloud management platform.

Unlike traditional remediation techniques and run book automation platforms that provide threshold-based automation, advanced machine learning techniques are utilized herein to detect issues with an application centric approach. The cloud management platform can integrate with various Cloud/PaaS providers and can auto detect (infer) an application topology with minimal user intervention. Integration with multiple monitoring providers is enabled and the metric data obtained can be overlaid on the inferred application topology. Application behavior is continually monitored and clustering techniques (e.g., self-correcting bounded clustering) may be utilized to identify misbehaving instances.

Another limitation commonly encountered with monitoring providers is collection delay. Monitoring providers commonly provide metric data that includes a data collection delay, e.g., a 15-20 minute data collection delay, which effectively leads to delayed detection of aberrant (abnormal) application behavior. For example, problems may be brought to notice of SREs after the collection delay. Per techniques of this disclosure, machine learning models are utilized to learn application behavior over time. The ML model(s) can predict a current (estimated) state of one or more applications and thereby compensate for missing data due to the collection delay.

Autonomous system characteristics in a cloud context are incorporated into the cloud management platform which utilizes an influx of data streams, e.g., time-series data of metrics, to build a layer of intelligence via a core decision engine that utilizes probability theory and applies machine learning techniques. The cloud management platform is self-learning and utilizes a self-correcting model to seamlessly manage cloud platforms with a focus on explainable decisions.

Abnormal and aberrant (anomalous) behavior of applications may arise from specific anomalous instances, errors in the application codebase, network issues, etc. Per techniques of this disclosure, a trained ML model is utilized to analyze application-level problems and instance level problems and provide a recommendation based on identification of a problem source.

A two-tiered approach is utilized, whereby an alert engine generates signals and/or scores based on identification of instance-level and application-level outlets from the monitored metrics for each configured application being monitored. The generated signals and/or scores are then provided to a core decision engine, which utilizes additional historical data and feedback from previously provided recommendations and/or actions to provide recommendations for a current scenario.

The cloud management platform (system) may also be utilized to determine performance of a new release of an application after a new release of code associated with the application. Based on a comparison of one or more performance metrics obtained for a pre-release time period and a post release time period, a deviation score may be determined that is indicative of a deviation from expected performance. Based on comparison of the deviation score with a threshold, suitable alerts may be generated, and in some cases, auto-remediation may be performed by rolling back to a previous version (pre-release) of the software application.

Machine learning techniques are utilized to assess client computing system topology, resource allocation settings, and performance metrics to ensure that software applications remain highly efficient, secure, available, and cost-effective.

Techniques of this disclosure may enable utilization of an actual production environment as a test bed, thereby improving the performance and efficiency of a distributed computing system. For example, a checkout application for an enterprise may be updated via a new release of the code associated with the checkout application. In some cases, the new codebase may perform comparably to the old release during a testing process, but may perform poorly in a production environment.

In some implementations, releases may be intelligently managed by the cloud management platform via a canary rollout, wherein releases may be tested on a small subset of machines/instances. The cloud management platform may be integrated with a release management system (release platform), and a carefully calibrated number of instances may be tested with a new release before rolling out the release to all instances.

In some implementations, autodetection of new releases may be performed, whereas in others, information about new releases, e.g., a time of release, release number, version number, build information, etc., may be explicitly provided/transmitted to the cloud management platform.

Techniques of this disclosure may enable a comparison of performance of one or more metrics for a particular release of a software in a calibrated manner (sequential scaleup) for an increasing number of virtual machines/instances. For example, the release may be propagated to a first set of instances, and based on the performance of the release meeting an acceptable threshold, may be propagated to a second set of instances. For example, a first set of instances may include a set of instances that represent about 2% of all instances at a given time and a second set of instances may include a set of instances that represent about 20% of all instances, before rolling out the release to all instances, thereby enabling efficient deployment planning. This may be facilitated by integration of the cloud management platform with one or more release platforms, e.g., Flagger, etc., for validation of new releases in a production environment with high confidence.

In some implementations, release information may be intimated to the cloud management contemporaneously to a new version release of a software application. In some implementations, release information may be intimated to the cloud management prior to a new release of a software application. This enables an early intimation of an impending release to the cloud management system.

In some implementations, an analysis of a release may be initiated by a user, e.g., via a user interface, for a release that may have occurred in the past. This may enable identification of anomalies that may have been introduced by the new release.

In some implementations, an analysis of a release may be performed automatically, e.g., by an automatic process based on auto detection of a release, e.g., based on detection of an updated build time, an updated build version identifier, a build number, detection of a change in size of a code base or a size of a code image, or may be inferred based on an alert from a performance management system, e.g., based on a change in a performance metric that meets a predetermined threshold. For example, an alert may be generated based on a degradation of one or more software applications as determined by one or more performance metrics being monitored and based on a subsequent determination that the performance degradation was not caused by a hardware issue. In some implementations, an alert may be generated based on an improvement observed for a performance metric of one or more software applications as determined by one or more performance metrics being monitored and based on a subsequent determination that the performance improvement was not caused by a hardware issue.

In some implementations, one or more reports may be generated based on the analysis. In some implementations, multiple reports may be generated, one at a time of a release or detection of a release, and additional reports based on particular threshold traffic conditions, or other specified conditions being met.

FIG. 1 is a diagram of an example distributed computing environment, in accordance with some implementations. FIG. 1 is a diagram of an example distributed computing environment, in accordance with some implementations. FIG. 1 illustrates an example system environment 100, in accordance with some implementations of the disclosure and illustrates a block diagram of an environment 100 wherein a cloud management service might be used. FIG. 1 and the other figures utilize similar (like) reference numerals to identify like elements. A letter after a reference numeral, such as "130," indicates that the text refers specifically to the element having that particular reference numeral. A reference numeral in the text without a following letter, such as "130," refers to any or all of the elements in the figures bearing that reference numeral (e.g., "130" in the text refers to reference numerals "130a," "130b," and/or "130n" in the figures).

The system environment 100 includes a cloud management system 110, which may include a variety of computer subsystems. Each of the subsystems can include a set of networked computers and devices.

The cloud management system is utilized to manage one or more distributed computing systems that are associated with one or more enterprise computer systems 160a, 160b, and 160n that utilize one or more cloud computing systems offered by respective infrastructure providers, 130a, 130b, and 130n that are connected via network 120.

Environment 100 may also include user devices 150a, 150b, and 150n that are utilized by users to access and/or execute one or more applications on the cloud computing systems. The cloud management system 110 itself may be implemented as a cloud-based system that is supplied and hosted by one or more third-party providers, and is accessible to users, e.g., system administrators and/or system reliability engineers (SREs), etc., via a variety of connected devices.

User devices 150 and enterprise computer system 160 may include any machine, system, or set of machines, systems that are used by an enterprise and users. For example, any of user devices 150 can include handheld computing devices, mobile devices, servers, cloud computing devices, laptop computers, workstations, and/or a network of computing devices. As illustrated in FIG. 1, user devices 150 might interact via a network 120 with a cloud computing system 130 that provides a service.

Cloud computing systems 130, cloud management system 110, and enterprise computer system 160 may utilize captive storage and/or cloud-based storage. In some implementations, on-demand database services may be utilized. The data store may include information from one or more tenants stored into tables of a common database image to form a multi-tenant database system (MTS). A database image may include multiple database objects. A relational database management system (RDMS) or the equivalent may execute storage and retrieval of information against the database object(s).

Access to cloud management system 110, enterprise computer systems 160, cloud monitoring system 140, and cloud computing system 130 may be controlled by permissions (permission levels) assigned to respective users. For example, when an employee or contractor associated with a cloud management system 110 is interacting with enterprise computer system 160, cloud monitoring system 140, user device(s) of the employee or contractor is provided access on the basis of permissions associated with that employee or contractor. However, an administrator associated with cloud management system 110 may be provided additional access privileges based on access privileges allotted to that administrator. In user systems with a hierarchical organization level, users at a certain permission level may have access to applications, data, and database information accessible to a lower permission level user, but may not be provided access to certain applications, database information, and data accessible to a user at a higher permission level. Thus, users can have different capabilities with regard to accessing and modifying application and database information, depending on a user's security or permission level.

Network 120 is any network or combination of networks of computing devices that enable devices to communicate with one another. For example, network 120 can be any one or any combination of a LAN (local area network), WAN (wide area network), telephone network, wireless network, point-to-point network, star network, token ring network, hub network, or other appropriate configuration.

The computer systems may be connected using TCP/IP and use other common Internet protocols to communicate, such as HTTP, FTP, AFS, WAP, etc. Users may access the systems by utilizing different platforms and frameworks, e.g., by using single-page client applications that use HTML and TypeScript.

An application execution environment as described herein can be any software environment that supports execution of a software application. For example, an application execution environment supported herein may be an operating system (e.g., Linux, Windows, Unix, etc.), a hypervisor that supports execution of one or more virtual machines (e.g., Xen®, Oracle VM Server, Microsoft Hyper-V™, VMWare® Workstation, VirtualBox®, etc.), a virtual computer defined by a specification, e.g., a Java Virtual Machine (JVM), an application execution container (e.g., containers based on Linux CGroups, Docker, Kubernetes, CoreOS, etc.), a process executing under an operating system (e.g., a UNIX process), etc. In some implementations, the application execution environment may be a software application, e.g., that is configured to execute on server hardware.

Techniques of this disclosure can be applied to a wide variety of deployment types, e.g., to distributed computing systems that utilize stateless containers, stateful containers, serverless deployments, etc.

Figure 2:
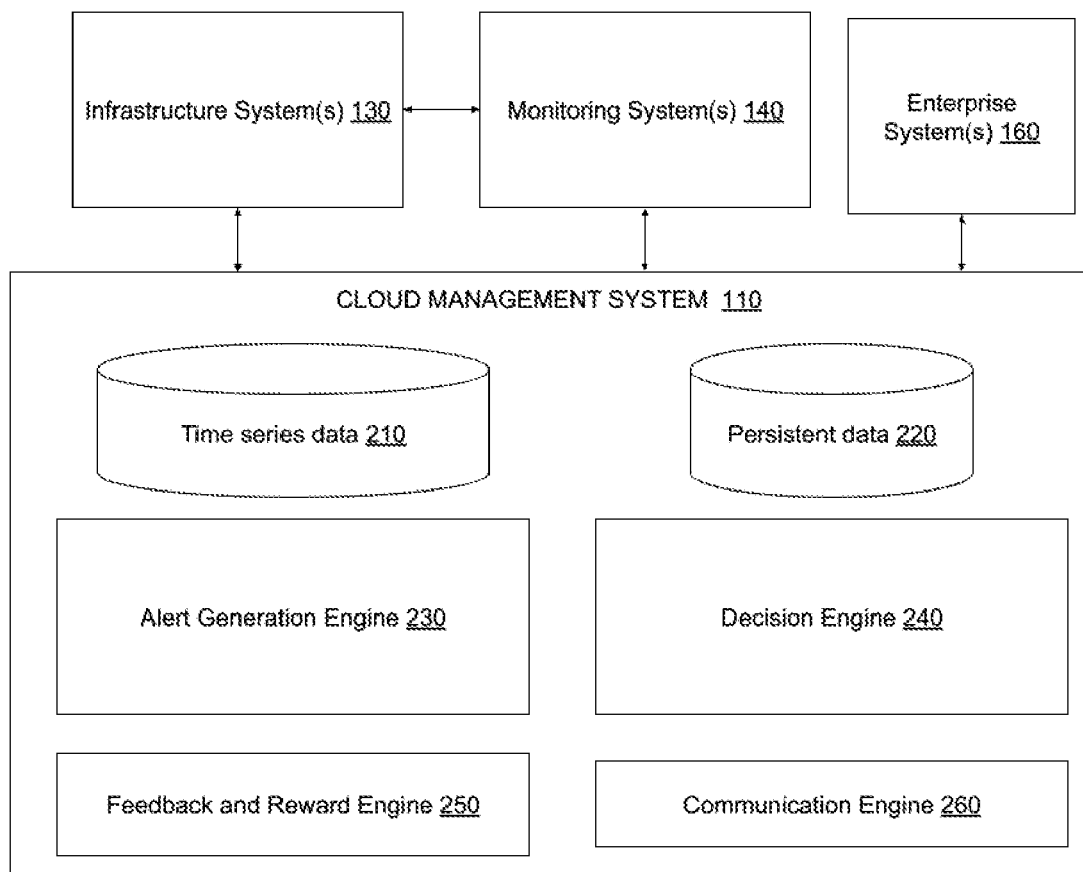
FIG. 2 illustrates a cloud management system, in accordance with some implementations.

FIG. 2 illustrates a cloud management system, in accordance with some implementations. Cloud management system 110 may include subsystems configured for different functionality. In some implementations, cloud management system 110 may include an alert generation engine 230, a decision engine (core engine) 240, a feedback and reward engine 250, and a communication engine 260. Cloud management system 110 may also include one or more databases (data stores), for example, a time series database 210, and a persistent database 220.

In some implementations, databases 210 and 220 may be configured as external databases and/or cloud-based data storage that is accessible to the cloud management system. In some implementations, the cloud management system 110 is communicatively coupled to one or more infrastructure systems 130, monitoring system(s) 140, and enterprise system(s) 160.

In some implementations, the cloud management system is configured to receive metric values associated with applications implemented on and/or executing on one or more infrastructure systems (cloud computing systems). The metric values may be received directly from the infrastructure systems and/or monitoring system(s) associated with respective infrastructure systems.

Figure 3:
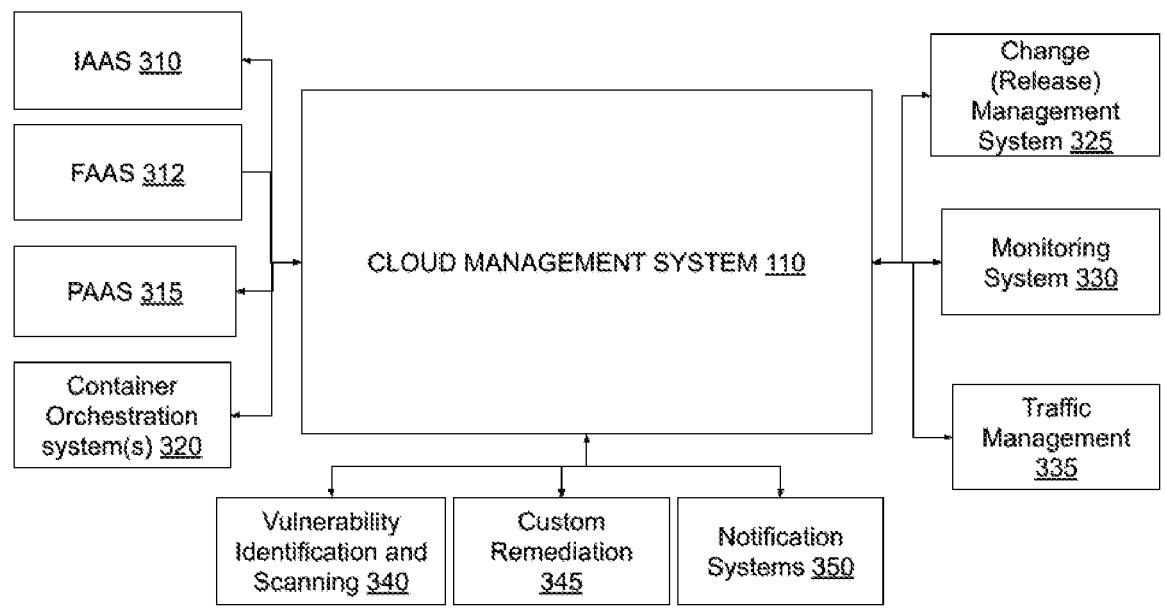
FIG. 3 is a diagram that depicts an example of a cloud management system and example interacting systems, in accordance with some implementations.

FIG. 3 is a diagram that depicts an example of a cloud management system and example interacting systems, in accordance with some implementations. As depicted in FIG. 3, the cloud management system is configured to interact with multiple systems for various purposes. For example, the cloud management system may be coupled to Infrastructure as a service (IAAS) systems 310 that enable an enterprise to lease or rent servers for compute and storage resources. The cloud management system may be coupled to IAAS systems located in different geographical locations.

In some implementations, the cloud management system may be coupled to Function as a service (FAAS) systems 312, also referred to as serverless systems that enable an enterprise to execute one or more functions as a service, and where payment for the use of the infrastructure is made on a per-use-basis, based on units of time consumed and a cost that may be based on an allocation of computing resource.

FAAS systems enable enterprises to only pay for infrastructure at a time of use, and not during idle times. Additionally, the infrastructure sizing, etc. is implemented by the service provider, thereby freeing up the enterprise from costs and efforts associated with infrastructure management.

In some implementations, the cloud management system may be coupled to Platform as a service (PAAS) systems 315 that enable enterprises to lease servers as well as receive access to other development and deployment resources, e.g., middleware, development tools, database management systems, business analytics services, etc.; to Container Orchestration systems 320 that enable automation of containerized workloads, e.g., Kubernetes, Docker Swarm, Apache Mesos, etc.

In some implementations, the cloud management system may be coupled to one or more Change (release) Management System(s) 325 that enable enterprises to manage change and release processes, manage version control, implement CI/CD techniques, and/or to meet their auditing and compliance requirements; to one or more monitoring systems 330; and to Traffic Management System(s) 335 that are utilized to manage cloud traffic at various layers.

In some implementations, the cloud management system may be coupled to a vulnerability identification and scanning system 340, e.g., which may operate upon alerts received from the cloud management system to detect security issues/flaws and or attacks.

In some implementations, the cloud management system may be coupled to a Custom Remediation System 345, operable to perform custom remediations based on detected anomalies.

One or more notification systems 350, e.g., Slack, pager systems, email systems, etc. may be coupled to the cloud management system for the transmission of alerts, messages, and notifications to users.

Figure 4A:
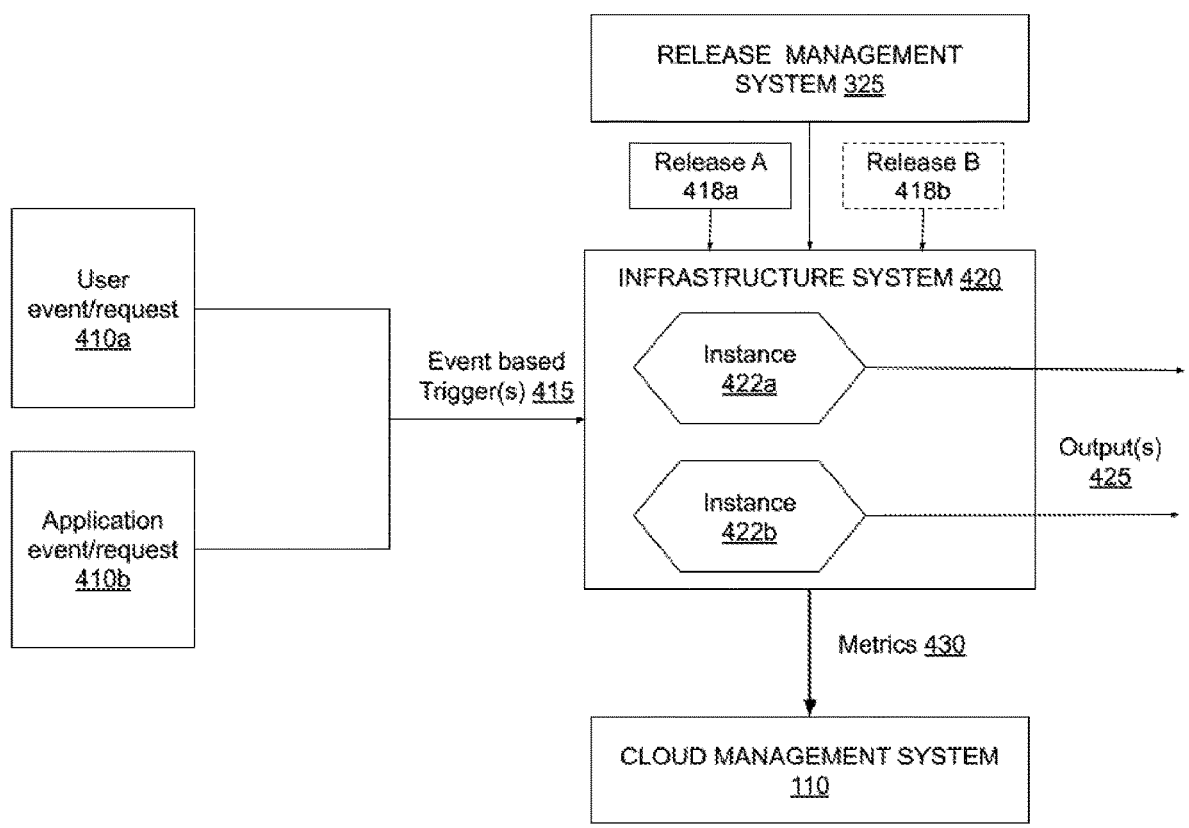
FIG. 4A depicts an example implementation of a serverless function in a distributed (cloud) computing environment, in accordance with some implementations.

FIG. 4A depicts an example implementation of a serverless function in a distributed (cloud) computing environment, in accordance with some implementations.

A serverless function environment, sometimes referred to as a Function as a service (FAAS), enables a user to utilize infrastructure hosted by a third-party provider, and only pay for the computing resources used. The execution of the function is based on a trigger/event trigger based on a user or application action. For example, as depicted in FIG. 4A, event-based triggers 415 may originate from a user request or event 410a that may originate on a user device. For example, a user may initiate an upload of a picture from their mobile device, which may serve as an event trigger.

Event based triggers may also originate based on an application event/request 410b, which may be another software application that triggers an event request.

Based on the event trigger, an infrastructure system 410 may invoke an instance 422a or 422b and execute a function associated with the event trigger. The code for the function may be typically previously provided by the enterprise, e.g., as a container, code, function call, etc. For example, in the scenario described earlier, the function may be a code set (code) that compresses the uploaded picture and stores it in a database for subsequent access. New releases of the code for the function (software application) may be managed by a release management system, e.g., change management system 325 described with reference to FIG. 3.

For example, as depicted in FIG. 4A, a current release, Release A 418a of a software application may be updated with a newer release, Release B 418b, which is first tested in pre-production environments. Upon meeting the requirements for release of the software application, release management system 325 may update the software application with the new release. The release may be introduced at a predetermined time, e.g., a time of low traffic, which may be specified by a developer or system administrator.

The release may be implemented via a file transfer, e.g., of a code base, code image, or container image, or via an update to a location or link where a software application release is stored. In some implementations, a partial release may occur, where only a portion of live traffic is routed to the new release.

Each instance or execution of the function may generate one or more outputs, writes to one or more database(s), output to user devices, etc.

Per techniques of this disclosure, one or more performance metrics 470 may be provided to the cloud management system 110, on a continuous, periodical, or indirect basis via a database or a monitoring system.

The metrics may include data that is aggregated as well as individual data points and may include metrics such as arrival data rates for requests and/or queries that trigger the function(s), latency for each request, runtime, memory utilized, start-up time, etc. In some implementations, the metrics may also include costs associated with the execution of the function.

Figure 4B:
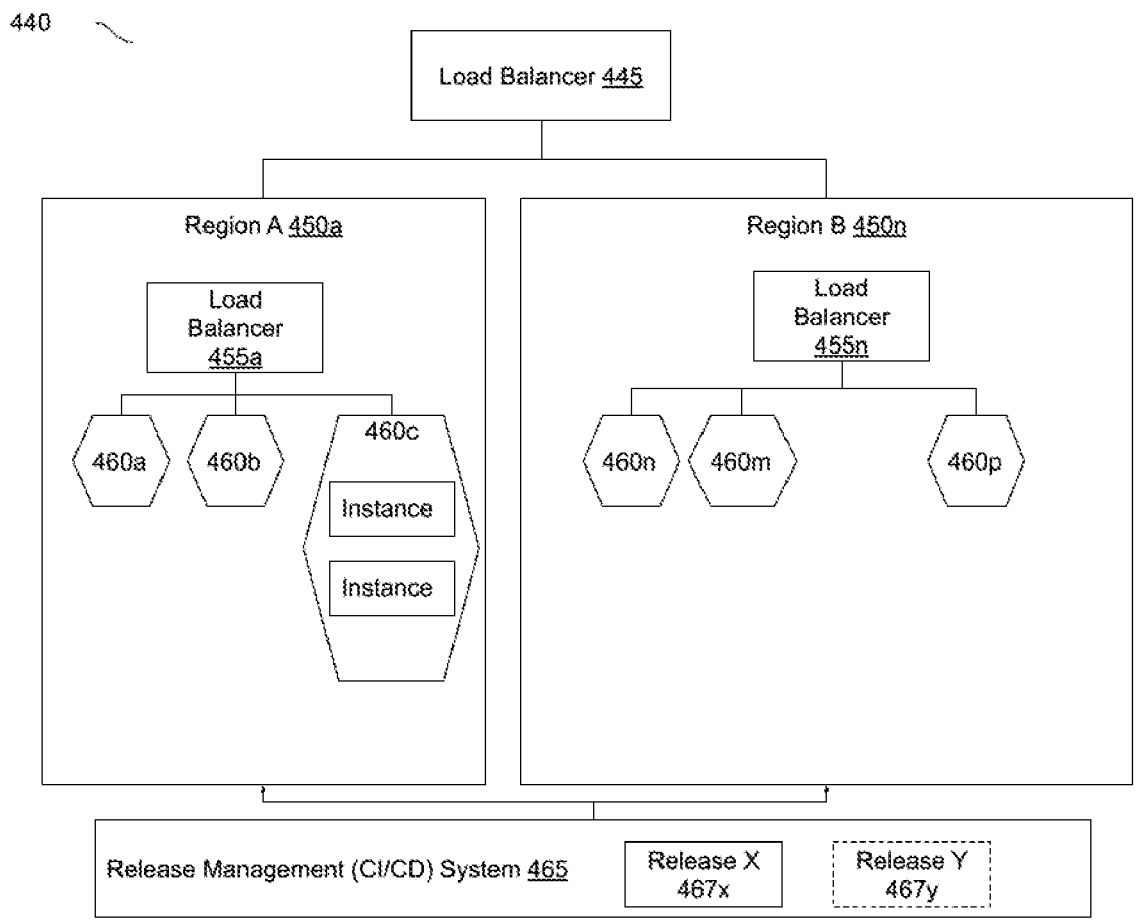
FIG. 4B depicts an example topology within a distributed (cloud) computing environment, in accordance with some implementations.

FIG. 4B depicts an example topology within a distributed (cloud) computing environment, in accordance with some implementations. This example topology may be utilized as part of a cloud-based implementation for one or more enterprise applications.

Distributed computing environments are commonly distributed over geographical regions to serve a diverse set of users, with dedicated computing resources earmarked for processing applications associated with a particular region. Within each region, one or more cloud computing systems may be utilized to serve and process applications. Load balancers at a global regional level are utilized to distribute the computing load evenly across available computing resources, and may also be utilized to introduce new releases in a calibrated and predetermined manner.

A first step undertaken by a cloud management platform is the discovery of a site (e.g., a client site) and charting of its topology. Subsequently, a complete and holistic state of all applications and infrastructure is registered, which enables complete observability and permits the system to become self-aware. Application tags for each application may be utilized to infer a particular site's infrastructure as well as to create custom profiles.

In this illustrative example, an example topology 440 of the computing environment is depicted in FIG. 4B. A load balancer 445 at the global level is utilized to receive requests, e.g., http requests, etc., from users and distribute it to regional computing clusters 450a or 450n.

Within each region, a load balancer may be utilized to distribute computing tasks to available resources. For example, load balancer 455a may be utilized in region 450a, and load balancer 455n may be utilized in region B.

Based on the type of requests, the load balancers may distribute tasks to available virtual machines within the cluster. Specialized management tools and software may be available for the distribution of tasks to resources.

In some implementations, a virtual machine may be utilized for only one type of application, whereas in other implementations, a virtual machine may be utilized for multiple types of applications, and even multiple applications from multiple client users.

Specific infrastructure providers may utilize different techniques and tools to track assignment of computing tasks to resources. For example, in some implementations, a load balancer may maintain a list of currently executing tasks, and alternately, a history or log of tasks processed as well.

In some other implementations, e.g., containerized systems, a state of a cluster of compute resources may be represented as objects that describe what containerized applications are running on which nodes, resources allocated to those applications, and any associated policies.

In some implementations, computing resources may be configurable. For example, in an environment that utilizes virtual machines, a quantity of memory or CPU allotted to each virtual machine may be configurable. Configurable environments may provide advantages by adjusting the resources based on the type of loads being handled. Configuration settings may be stored and/or adjusted autonomously or via human intervention.

A release management system 465 may be utilized as part of a CI/CD system to provide a suitable code base, image, etc., for utilization in the distributed computing system. The release management system may be integrated with the cloud management system.

For example, an existing release of software application, Release X 467*x* may have an updated release, Release Y 467*y*, which may be introduced to the production environment 440 by release management system 465. The release may be performed in a calibrated manner with suitable integration with one or more load balancers. In some implementations, a new release may be introduced to only selected regions of a plurality of regions, e.g., only Region B, in this illustrative example. In some other implementations, a new release may be introduced to a selected number or percentage of computing devices utilized by the software application. This may be achieved via suitable instructions provided to one or more load balancers that are utilized to handle live traffic.

FIG. 4C depicts an example performance metric record utilized in monitoring a distributed computing system, in accordance with some implementations.

As described earlier, the cloud management system may receive and/or obtain one or more metric values from a cloud computing system and/or monitoring system associated with one or more applications that are being monitored and managed.

In some implementations, the metric values may be automatically received by the cloud management system. In some other implementations, the metric values may be obtained by querying a database, e.g., a Prometheus database, etc. at periodic intervals.

In this illustrative example, an example monitoring metric record for a performance metric 470 is depicted, with associated attributes; a metric name 475, a metric identifier 480, and other attributes, e.g., an originating infrastructure provider (cloud computing provider) identifier, a monitoring metric provider, a metric type, a data type associated with the monitoring metric, metric scope, an auto remediate field that indicates whether auto remediation should be performed based on the particular metric, a detection threshold for any anomaly (aberrant behavior) detection, and notes associated with a metric.

The list of attributes for the example metric provided above is provided as an example, and is not exhaustive, and specific implementations may utilize additional metric values for each application being managed/monitored, and some implementations may omit some of the attributes altogether.

Metric values and their attributes may be specified by a user, e.g., a user or administrator associated with an enterprise system, monitoring system, or cloud computing system provider, or be automatically inferred by the cloud management system.

A suitable user interface may be utilized to enable users to define/specify metric values and associated attributes. Menu options, e.g., pull-down menu options, etc., may be provided to enable easy user selection of monitoring metric and associated attributes. For example, a metric type attribute for a monitoring metric may be specified to be one of a volume, saturation, latency, error, ticket; a data type for a monitoring metric may be specified to be one of a number, a percentage, or a counter; a metric scope for a monitoring metric may be specified to be one of site wide, application specific, load balancer, or instance.

In some implementations, the attributes may be specified by tags that are associated with the monitoring metric and provided by the cloud computing system or the monitoring system that is generating and providing the metrics.

Figure 5:
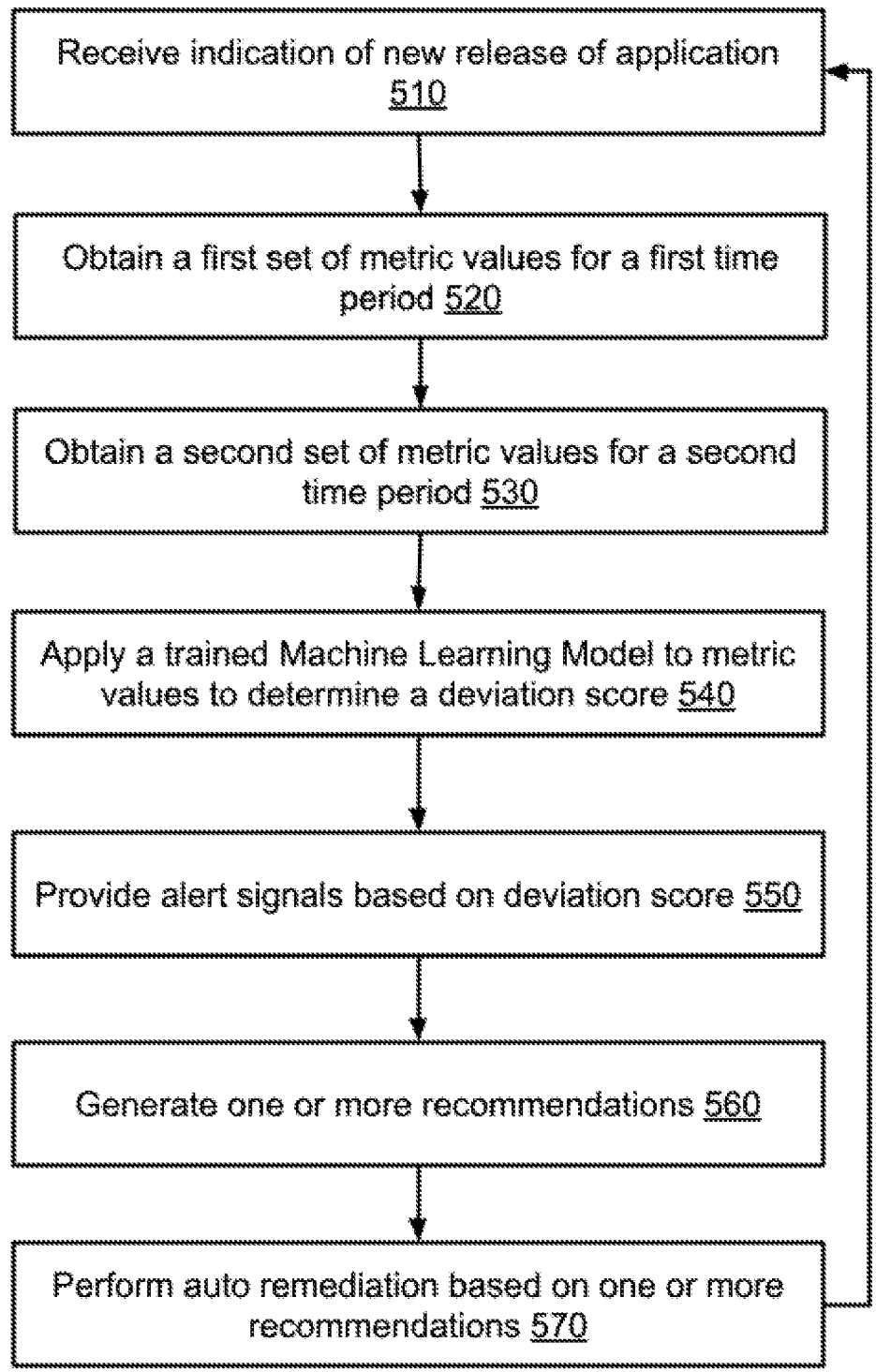
FIG. 5 is a flowchart illustrating an example method to generate an alert based on a release of a software application implemented on a distributed computing system, in accordance with some implementations.

FIG. 5 is a flowchart illustrating an example method to generate an alert based on a release of a software application implemented on a distributed computing system, in accordance with some implementations.

The distributed computing system may be a serverless computing system or a virtualized environment, and the software application may be a function or package configured to be executable on the serverless computing system or in the virtualized environment. For example, the distributed computing system may be a containerized computing system, a Kubernetes cluster, a stateless application, a Platform as a service (PAAS), etc.

In some implementations, method 500 can be implemented, for example, on cloud management system 110 described with reference to FIG. 1. In some implementations, some or all of the method 500 can be implemented on one or more enterprise computer systems 160, on cloud computing system 130, on cloud monitoring system 140, as shown in FIG. 1, on and/or on a combination of the systems. In the described examples, the implementing system includes one or more digital processors or processing circuitry ("processors"), and one or more storage devices (e.g., databases 210, 220, or other storage). In some implementations, different components of one or more servers and/or clients can perform different blocks or other parts of the method 500. In some examples, a first device is described as performing blocks of method 500. Some implementations can have one or more blocks of method 500 performed by one or more other devices (e.g., other client devices or server devices) that can transmit (provide) results or final/intermediate data to the first device.

In some implementations, the method 500, or portions of the method, can be initiated automatically by a system. In some implementations, the implementing system is a first device. For example, the method (or portions thereof) can be periodically performed, or performed based on one or more particular events or conditions, e.g., receiving a notification of a new (updated) release of a software application, reception of performance metric data, at a predetermined time, a predetermined time period having expired since the last performance of method 500, and/or one or more other conditions or events occurring which can be specified in settings read by the method.

At block 510, an indication of a new release of a software application is received.

In some implementations, the indication of the release of the software application may be based on receiving an indication based on detection of an updated build version number of the software application. The detection may be based on a machine agent that monitors running instances of a software application implemented over a distributed computing system. The detection may be based on detection of a change in a label or identifier associated with the software application, e.g., based on received metadata, e.g., version identifier, etc., about the software application. In some implementations, the detection may be based on information received directly from a release management system or CI/CD system, e.g., based on a data record or notification received from a change (release) management system, e.g., change management system 325 described with reference to FIG. 3.

In some implementations, other metadata may be utilized even if version information is not available, for example, based on metadata that includes a build time, code size, etc., based on detection of an updated build time, a change is size of a code base, etc., of the software application.

In some implementations, e.g., serverless systems, information may be received from a service provider, e.g., a cloud infrastructure provider, that includes data about the state of release of a software application. In some implementations, data may be received from a CI/CD, versioning, or other release management system.

In some implementations, information about a release may be received from a user input specifying that a new release is scheduled for a future time and specifying a time of release and other release information, e.g., build identifiers, etc. A notification of the release may be provided to a cloud management system. In some implementations, additional information may be provided specifying topological details of the release, e.g., identifying which instances may be utilized for the new release, etc.

In some implementations, the software application is a serverless (stateless) function and detection of a new release of the software application is based on detection of a change in one or more performance metrics for the software application. For example, the detection of the new release may be based on detection of a change in performance metrics that meets a predetermined threshold. The threshold may be determined based on a multiple of a previously observed standard deviation of a performance metric recorded for the software application. Both positive and negative changes in performance metrics may be utilized to detect a new release of the software application. While negative (performance degradation per the metric) may be indicative of errors in code etc., thereby needing additional investigation for which an alert may be generated, performance metrics indicative of positive changes (performance improvement per the metric) may be indicative that certain function calls are not being made, etc., and an alert may be generated in some implementations for performance improvements that meet a certain threshold.

In some implementations, an analysis of a release may be performed in the context of A/B testing a release. A first set of instances may utilize a first version of a software application, and a second set of instances may utilize a second version of a software application. Performance of each of the releases may be compared. A load balancer may operate in an integrated manner whereby selected instances utilize a new version/release, e.g., of 10 total instances, a new version may be instantiated only on 2 instances, and incoming traffic may be routed accordingly.

The performance of each set of instances may be monitored, thereby utilizing the production environment as a test bed. For example, a new release of a software application may be received. A first set of instances may be selected to assign the new release to for processing. The new release may be assigned to the first set of instances, while a second set of instances may utilize a previous (or different) version of the software application.

Performance metrics that include one or more metrics may be received for the first and second set of instances, which are then compared to determine a performance deviation, e.g., a deviation score, due to the new release. One or more alerts may be generated based on the deviation score.

In some implementations, the cloud management system, and specifically, a release analysis subsystem of the cloud management system may be integrated with a CI/CD system. For example, in a virtual machine context, the cloud management platform system may be integrated with the release/change management system such that at a time of release, a subset of incoming queries and/or traffic are served by a new release. A cluster-based approach may be used to determine an overlap of anomalous clusters with instances associated with a new release.

Block 510 may be followed by block 520.

At block 520, a first set of metric values is received for a first time period. The metrics may include one or more metrics included in a list of metrics to be monitored for the software application. The first set of metric values for each metric of a list of metrics is received for a first time period preceding a time of release of the release. The first time period may be a configurable parameter based on the software application and/or user input and may take into account seasonality and timing of the release.

In some implementations, the first time period may be determined, e.g., by a processor in the cloud management system, based on statistical properties of one or more metrics in the list of metrics. For example, a standard deviation or variance of one or more metrics in the list of metrics may be utilized to determine the first time period such that a sufficient number of data points (samples) are obtained for the software application.

The metric values may be received from different cloud providers and/or monitoring providers. In some implementations, received metric values may be normalized to a single format (standard), which may be applied across all providers to enable comparison and combination of metric values received from different sources.

In some implementations, the metric values are received as time-series data associated with a particular time period (interval). In some implementations, additional normalization operations may be performed such that the time-series data of different metric values are synchronous and refer to the same time period.

In some implementations, the time-series data is obtained by querying a database where the time-series data is stored, e.g., an external data source at a cloud computing system or a cloud monitoring provider or third-party provider. In some implementations, the time-series data may be obtained by querying a time-series database, e.g., database 210 described with reference to FIG. 2. In some implementations, the time-series data may be obtained from a monitoring solution and time series database, e.g., Victoria Metrics, Prometheus, etc. In some implementations, the time-series data may be obtained via a pull model wherein an initial request for data may originate from the cloud management system, which is then responded to by the database server.

The time series data may be obtained for multiple time intervals, e.g., time intervals of 1 hour, 2 days, 7 days, 3 months, 6 months, etc. In some implementations, different time intervals may be utilized for different applications and/or infrastructure providers.

In some implementations, normalization of the obtained metric values may be performed, e.g., if received from different sources that have different scales, units, etc. In some implementations, a topology of the distributed computing system may be inferred periodically, e.g., every 20 minutes, every 30 minutes, etc.

The first set of metric values for each metric of the list of metrics may be received for a first time period preceding a time of release of the software application for a predetermined time period preceding the (prior to) time of release. Example predetermined time periods may include 1 hour, 2 hours, 8 hours, 1 day, 2 days, 1 week, etc. In some implementations, the predetermined time periods may be based on a speed (rate at which versions of software applications are released) and timing of releases (time elapsed from previous release, etc.).

In some implementations, a reduced set of metrics may be utilized to perform a release analysis. For example, one or more input metrics and one or more value metrics may be identified in the first set of metrics and a second set of metrics that is a predictive set of the one or more value metrics may be determined, whereas the second set of metrics has fewer elements than the first set of metrics. In some implementations, only the second set of metrics is utilized for the release analysis.

In some implementations, the obtained first set of metrics may include a combination of actual metric values, e.g., received from a monitoring or other system, and metric values that are obtained via extrapolation or regression from actual metric values.

Block 520 may be followed by block 530.

At block 530, a second set of metric values for a second time period is received. The second set of metric values may correspond to a second time period subsequent to (following the) a time of release. In some implementations, the second set of metric values may be for a period different from, e.g., obtained for a longer or shorter time period, than for the first set of metric values. In other implementations, the second set of metric values may be for a period that is identical to the period for which the first set of metric values are obtained. In some implementations, a report and/or alert may be generated and transmitted to a user based on an analysis of the release for the second time period.

In some implementations, the second set of metric values may include a first subset of metric values that are obtained directly from a monitoring system or other database, and a second subset of metric values that are obtained via regression based on the first subset of metric values. This may enable a quicker analysis of the release of the software application without the need to obtain additional post-release metric values.

In some implementations, the second time period may correspond to a time period that immediately follows the time of release. In some implementations, the second time period may be a time period that commences following a predetermined time following the time of release. This may enable certain transient effects to be ignored when performing a comparison of the first set of metric values and the second set of metric values.

In some implementations, a third set of metric values for each metric of the list of metrics may be obtained for a third time period following the time of release. The third time period may correspond to a time of high traffic (traffic that meets a specified threshold traffic) and may be selected/determined based on previously measured traffic patterns, seasonally observed/measured traffic patterns, or based on a detection of high traffic by the monitoring and/or cloud management system. In some implementations, the third time period may correspond and/or overlap with a time period specified by a user. In some implementations, a report may be generated and transmitted to a user based on an analysis of the release for the third time period.

In some implementations, the first, second, and third time periods may correspond to time periods that may be either continuous or discontinuous time periods. For example, a software application may have a release scheduled for midnight, and a first time period may correspond to a time period of one hour prior to midnight, a second time period may span the period from midnight to 2 am, and a third period may correspond to 9 am to 9:30 am the following day, which may be a time of high traffic.

The first, second, and third time periods may also be different time periods in absolute time, but may correspond to a time of similar traffic, when a software application is implemented on a distributed computing system that operates over different regions and/or time zones.

In some implementations, the obtained second and third set of metrics may include a combination of actual metric values, e.g., received from a monitoring or other system, and metric values that are obtained via extrapolation or regression from actual metric values.

In some implementations, multiple sets of metric values may be obtained and/or monitored following a time of release to ensure that a new release that does not indicate a problem does not cause a performance issue at a subsequent time.

In some implementations, intimation of a release may be received before post-release data is available due to notifications received from a release management system.

Block 530 may be followed by block 540.

At block 540, the obtained first set and second set of metric values are compared by providing them as input to a trained machine learning (ML) model. The ML model may be a pre-release model that is a mapping between an input parameter, e.g., traffic and behavior of application, as measured by one or more metrics utilized to monitor performance of the software application.

A deviation score may be determined by utilizing the ML model based on a comparison of the first set of metric values and the second set of metric values. The deviation score is an indicator of a degree of deviation of the second set of metric values from the first set of metric values and of a degree to a difference in performance of the new release when compared to the previous release.

In some implementations, a respective deviation score may be generated for each metric of the list of metrics using the trained machine learning model. Each deviation score may be indicative of a deviation for the corresponding metric being measured. For example, a release may impact a first metric in a first magnitude and a first direction (for example, indicating an improvement in performance) and a second metric in a second magnitude and a second direction (for example, indicating a degradation in performance. Multiple deviation scores may be combined to generate a composite deviation score for the release. The deviation score for each metric may be weighted based on a relative importance of the corresponding metric. For example, metrics that are likely to affect user facing applications and functions may be weighted to a greater extent than a metric that does not affect a user facing function or application.

In some implementations, traffic and/or other input metrics associated with the second time period (new release data) may be utilized by the ML model to determine a predicted state of the software application, as indicated by one or more performance metrics and metric values for the list of metrics.

In some implementations, the ML model may be a time series forecasting model, e.g., an autoregressive integrated moving average (ARIMA) model for the metrics for the software application. The ML model may utilize a combination of a previous number of states for a particular metric, and a feature vector based on one or more parameters, e.g., traffic, to predict a current state for the particular metric.

The first and second sets of data, corresponding to pre-release and post-release time periods are utilized by the ML model to determine a predicted state of the software application, as characterized by one or more metrics. Specifically, input parameter(s) and/or input metrics from the second (post-release) time-period are used as a feature input to the ML model that is trained on data from the first time period to determine a predicted state of a metric of the software application. Post-release input metrics are utilized to determine a state of the software application, assuming the new release exhibits a similar behavior to a previous release of the software application, as characterized by the trained ML model. A standard deviation may be determined based on the metrics associated with the first time period.

In some implementations, a first order ARIMA model is utilized, and a moving average of 4 previous states is utilized to predict a current state of a metric associated with the software application.

In some implementations, a different number of previous states may be utilized. For example, 3, 6, 10, or 12 previous states may be utilized. In some implementations, a previous number of states may be a number between about 3 and about 20.

In some implementations, a predicted state (value) may be determined for each metric, e.g., a value metric, or an output metric, based on one or more input metrics. A predicted state of an application may be determined based on multiple predicted metrics.

Metric values from the second time period are utilized to determine an actual state of one or more metrics of the software application.

A deviation score is determined based on a comparison of the predicted state and the actual state. The score may be determined by determining a ratio of the difference between the predicted and actual states (relative to) and a standard deviation for the state. In some implementations, the deviation score may be based on a multiplier of the difference between the predicted and actual states.

For example, the deviation score for a particular metric may be determined by determining the difference between a predicted value for the metric (based on applying an ML or other mathematical model to metric data from a first pre-release time period) and an actual value for the metric (based on metric data received for the second (or third, or other) post release period) to determine a deviation. The deviation may be normalized by a standard deviation or variance determined for the metric in pre-release data (first time-period) to obtain a relative deviation. A multiplier is applied to the relative deviation to determine a deviation score.

In some implementations, the predicted value for a metric at an instant t may be determined by the equation:

$$M_t = \sum_{m=1}^{j} \sum_{n=1}^{k} f_m(M_{t-n}, T_{t-n})$$

where $M_t$ is a value of a particular metric M at time t, and $T_t$ is a value of a traffic volume T at time t. The set of functions may be selected for the particular metric based on a training dataset. Up to k states and j functions may be utilized to determine the predicted value.

In some implementations, the predicted value for a metric at an instant t may be determined by the equation:

$$M_t = \sum_{m=1}^{j} \sum_{n=1}^{k} f_m(M_{t-n}, T_t)$$

where a current value of the traffic T is utilized for determine a predicted value for the metric.

In some implementations, the predicted value for each of the metrics may be based on a magnitude of change of the metric during previous releases of the software application. A previous history of release-based statistics may be utilized to obtain a magnitude of change of a metric during previous releases of the software application. In some implementations, the predicted state of the software application may be based on seasonal metric data associated with the software application.

In some implementations, a clustering method may be utilized to perform release analysis. This method may be advantageously utilized to evaluate a canary release, or for pre-release testing, where an updated version (new release) of a software application is released to a selected subset of instances of a total number of instances. For example, metric data may be obtained for a plurality of instances of the software application that includes a first time period (pre-release) and a second time period (post-release). The plurality of instances may be grouped into a plurality of clusters. One or more dominant clusters may be determined based on a number of instances included in the plurality of clusters and one or more lonely clusters may be identified that lie outside a range bounded by the one or more dominant clusters. A deviation score may be determined based on a comparison of a size of the identified one or more lonely clusters that include instances from the second (or third) time period to a total number of instances in the plurality of instances.

During the release analysis, one or more dependencies, e.g., database calls, function calls, etc., of the software application may be identified. A comparison may be made of pre-release and post-release dependencies and included in a report or alert generated as part of the release analysis. For example, a first (or additional) dependency may be identified for a new release that was not a dependency for an old release. Alternatively, a second dependency may be identified in an old release that is no longer a dependency for the new release. Identified changes in dependencies may be transmitted via a notification, alert, or report.

Block 540 may be followed by block 550.

At block 550, an alert and/or alert signals may be generated and/or provided based on the deviation score.

In some implementations, the alert may be a report of the deviation score and may highlight metrics where significant deviation scores are observed. In some implementations, the alert may be transmitted through multiple channels, e.g., Slack, paging systems, etc.

In some implementations, a number and type of channels for transmitting an alert may be based on the deviation score(s). The alert may be transmitted via a user interface, e.g., screen display, or a communication channel, e.g., email, pager, Slack, etc. The alert may also be based on a severity score and a detection time of one or more aberrations or anomalous behavior (deviations) detected in a new release of a software application.

Both positive and negative deviation score(s) may be flagged and alerted to a user. For example, a deviation score may be a positive deviation score and be indicative of an improvement in performance of the software application. The deviation may also be a negative deviation score and be indicative of a degradation in performance of the software application.

A record of a release analysis for a current release of a software application, e.g., a difference between predicted and actual states may be stored, e.g., in a database for future release analyses.

Block 550 may be followed by block 560.

At block 560, one or more recommendations may be generated. In some implementations, a release status may be determined for the software application based on the alerts and/or deviation score(s).

Based on a quantity (a number of metrics indicative of a deviation that meets a threshold and/or magnitude of deviation) and a type (a particular type of metric for which a deviation is determined), a suitable recommendation may be generated. For example, metrics that may impact user experience may utilize a lower threshold than a metric that has an impact on backend processing. For example, metrics such as volume metrics, availability metrics, errors, saturation, latency, etc. may utilize lower thresholds and be flagged based on a smaller observed deviation when compared to other metrics.

In some implementations, a recommendation may include a recommendation to check dependencies that may have been inadvertently introduced and/or inadvertently removed during a release.

Block 560 may be followed by block 570.

At block 570, one or more auto remediation actions may be performed based on the recommendations.

Auto-remediations may be undertaken autonomously by the cloud management system based on configuration settings, client instructions, and a magnitude of a deviation score and a type of metric exhibiting a deviation. For example, in some implementations, an action may be undertaken to roll back to a previous release of the software application, e.g., based on the deviation score.

For example, if a deviation score meets a critical deviation threshold that is determined to be an indicator of a critical dysfunction in a system or software application, an immediate rollback of the release may be performed as an auto remediated action.

Blocks 510-570 can be performed (or repeated) in a different order than described above and/or one or more steps can be omitted. For example, in some implementations, block 540 may be performed twice, once with a first set of metric values and again with a second set of metric values, and block 550 may be followed by block 570 in some implementations.

Figure 6:
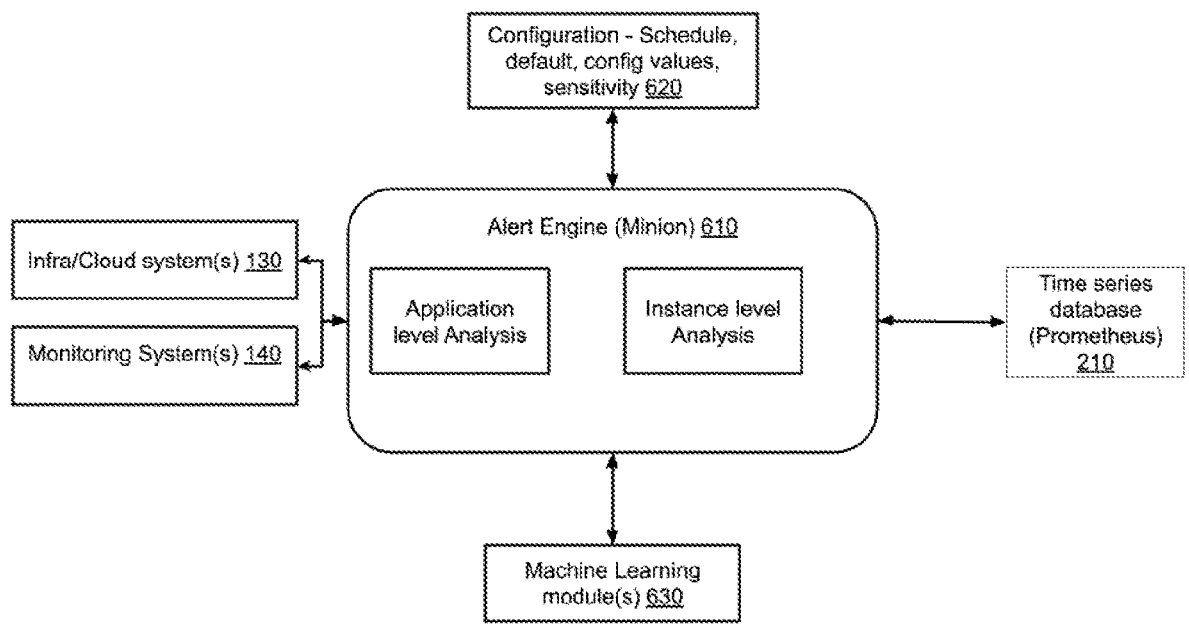
FIG. 6 is a block diagram that depicts an example implementation of an alert engine (minion) and interacting components, in accordance with some implementations.

FIG. 6 is a block diagram that depicts an example implementation of an alert engine (minion) and interacting components, in accordance with some implementations.

As depicted in FIG. 6, alert engine 610 is configured to receive inputs, e.g., metrics from infrastructure/cloud systems 130 and/or monitoring systems 140. The alert engine is also coupled to configuration module 620, which may store information about one or more applications to be monitored, metrics to be monitored, metadata associated with the metrics, client organization preferences and priorities, thresholds, sensitivity coefficients associated with various metrics and applications, etc.

The alert engine (minion) is coupled to time series databases 210, e.g., a Prometheus database, that may be utilized to obtain time-series data about various metrics associated with one or more applications. In some implementations, time-series data may be obtained with a predetermined delay, e.g., a 20-minute delay. In some implementations, the time-series data may be obtained with a dynamic lag (delay), and the delay may be specified during the data transfer or may be subsequently estimated based on time-stamp data, etc. In some implementations, an adjustment is made to extrapolate the lagged (delayed) time-series data in order to estimate a current value of time-series data based on previously received time-series data, and release analysis may be performed on extrapolated data determined in this manner.

The alert engine is utilized to determine a predicted value for each metric of a plurality of metrics based on previous values of each metric and previous values for traffic (input metrics) using a mathematical or ML model, e.g., the model described with reference to FIG. 5.

In some implementations, the extrapolated data is obtained based on regression, e.g., linear regression, polynomial regression, etc., of the previously received time-series data.

For example, an estimated current value based on just received (which may be delayed by a predetermined time, or may include delay that can be estimated based on time-stamps) and patterns of time-series determined based on a history of received time-series data, e.g., last 2 sets, last set, etc. In some, adjustments may be made to also include seasonality-based trends.

The alert engine 610 is also coupled to one or more machine learning module(s) 630 that are utilized for anomaly and outlier detection. The alert engine may be utilized to perform checks on various types of anomalies and may utilize multiple techniques for anomaly detection.

Figure 7:
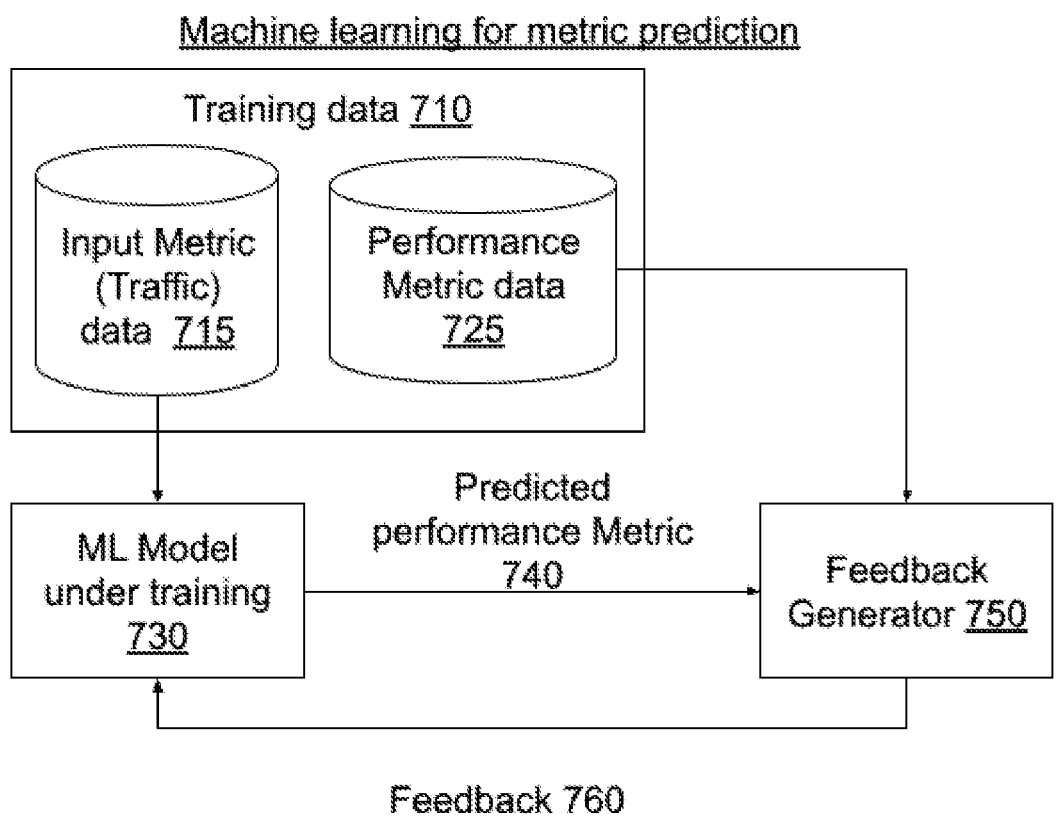
FIG. 7 is a block diagram illustrating an example of machine learning (ML) to predict a performance metric for a software application, in accordance with some implementations.

FIG. 7 is a block diagram illustrating an example of machine learning (ML) to predict a performance metric for a software application, in accordance with some implementations.

The supervised machine learning can be implemented on a computer that includes one or more processors and memory with software instructions. In some implementations, the one or more processors may include one or more of a general-purpose central processing unit (CPU), a graphics processing unit (GPU), a machine-learning processor, an application-specific integrated circuit (ASIC), a field-programmable gate array (FPGA), or any other type of processor.

In this illustrative example, supervised learning is used to train a machine learning (ML) model 730 based on training data 710 and a feedback generator 750. ML model 730 may be implemented using any suitable machine learning technique, e.g., a feedforward neural network (FNN), a convolutional neural network (CNN), or any other suitable type of neural network. In some implementations, other machine learning techniques such as Bayesian models, support vector machines, hidden Markov models (HMMs), etc. can also be used to implement ML model 730.

The training data 710 includes input metric (traffic) data 715 for one or more software applications and corresponding performance metric data 725. The input metric data may include any input metric data, e.g., data described with respect to FIG. 4C. The input metric data and corresponding performance metric data may be obtained from a time-series database, from a monitoring system, etc.

In this illustrative example, input metric data 715 are provided to a machine learning (ML) model under training 730. The ML model generates a predicted performance metric 740 based on a current state of the ML model and the input metric data, e.g., metric values such as latency, start-up time, etc. For example, the ML model may determine a feature vector (or embedding) based on features of input metric data 715. The feature vector (or embedding) may be a mathematical, multi-dimensional representation generated based on the input metric data 715.

ML model 730 may generate a predicted performance metric for the software application based on the input metric data associated with the software application, e.g., based on the feature vector, and/or based on similarity with feature vectors of other software applications and performance metrics associated with those other software applications.

The predicted performance 740 generated by ML model 730 is provided to feedback generator 750.

Feedback generator 750 is also provided with the groundtruth performance metric 725 corresponding to the software application, as measured and/or reported. Feedback 760 is generated by feedback generator 750 based on a comparison of the predicted performance metric with the groundtruth performance metric. For example, if predicted performance metric 740 is within a predetermined threshold distance of a groundtruth performance metric 725, positive feedback may be provided as feedback 760, while if the predicted and groundtruth metrics are far apart and outside a threshold distance, negative feedback is provided to the ML model under training, which may be updated based on the received feedback using reinforcement learning techniques.

In some implementations, a set of functions, F is hypothesized, wherein each function f in the set of functions, is a function of a metric value at a previous point in time and a traffic volume at the previous point in time.

A predicted value for a metric at an instant t may be determined by the equation:

$$M_t = \sum_{m=1}^{j}\sum_{n=1}^{k} f_m(M_{t-n}, T_{t-n})$$

where $M_t$ is a value of a particular metric M at time t, and $T_t$ is a value of a traffic volume T at time t.

For each function f in F, a value is computed for f for each timestamp. The computed values are utilized as features and $M_t$ is a selected as a target value in a regression. A gradient boosted tree is utilized to fit multiple functions to a training data set, and the most relevant features are selected, which are indicative of the best forms of the function fn.

The selected functions are utilized to subsequently predict a value for a metric based on previous values of the metric and on previous values of the traffic volume.

In some implementations, a unique set of functions may be determined for each pairwise set of a particular metric of a software application and a particular traffic volume. In some implementations, the same set of functions may be utilized for all pairwise sets of metrics and traffic volume for a software application.

In some implementations, the ML model includes one or more neural networks. The neural network(s) may be organized into a plurality of layers including a plurality of layers. Each layer may comprise a plurality of neural network nodes. Nodes in a particular layer may be connected to nodes in an immediately previous layer and nodes in an immediately next layer. In some implementations, the ML model may be a convolutional neural network (CNN).

In some implementations, the ML model is an ARIMA model that is trained to predict a metric value based on previously observed metric values and features that include one or more input metrics.

The ML (or mathematical) model is utilized to determine a predicted value for a metric based on previous values for the metric and traffic values (traffic metrics/input metrics) for a predetermined number of states/time-intervals, e.g., previous 3 states, previous 4 states, previous 10 states, or a number of states between 3 and 10. One or more metrics, e.g., CPU, latency, etc., may be utilized to monitor a software application, and one of more traffic metrics, e.g., incoming queries, network traffic, data base calls, etc., may be utilized as an independent variable for the model.

In some implementations, an ML or mathematical model may use a selected traffic metric from amongst multiple traffic metrics based on an accuracy of estimation of the metrics being monitored.

The training of the ML model may be performed periodically at specified intervals, or may be triggered by events. In some implementations, the training may be repeated until a threshold level of performance prediction accuracy is reached.

Figure 8:
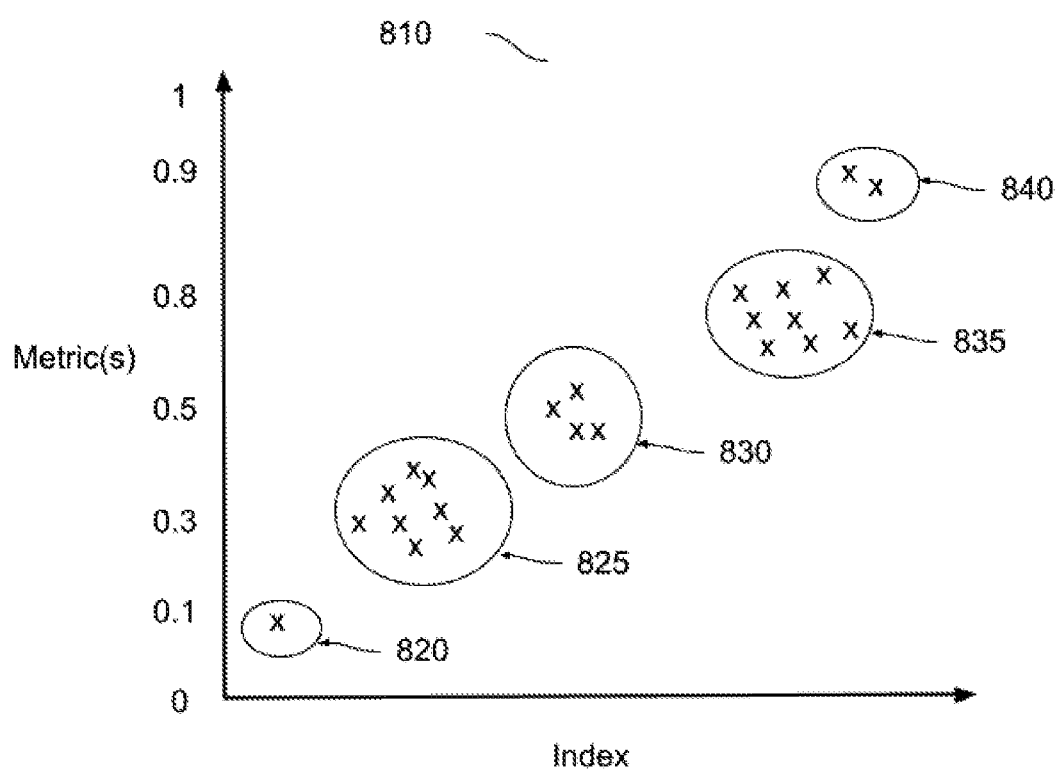
FIG. 8 depicts example detection of outliers, in accordance with some implementations.

FIG. 8 depicts example detection of outliers, in accordance with some implementations.

Outlier detection may be utilized to identify instances of new releases of applications that are associated with abnormal behavior that may be indicative of one or more problems or anomalous behavior. For example, if in a certain scenario, ten instances are associated with an application, it is expected that they are substantially similar in behavior and are expected to have the same range of values for metrics such as CPU, memory, latency, etc. Anomaly detection (outlier detection) is utilized to determine if one or more instances associated with a software application are behaving differently from their peer instances, and additionally determining what proportion of the instances of the software application behaving differently are associated with a new release of the software application. In some implementations, outlier detection is performed one metric at a time, for all monitored metrics across a set of monitored applications.

For a particular metric of an application, the corresponding metric value is obtained for all instances of the application, including from pre-release and post-release versions. The metric values may be obtained, for example, by querying a suitable time-series database, as described earlier.

A recursive clustering process may be utilized to determine an optimal number of clusters. Clusters with a varying number of clusters are generated based on the metric values. A silhouette coefficient (score or value) is determined for the clusters that is indicative of a tightness of the cluster. The silhouette coefficient for a set of clusters of a metric is a measure of how similar a metric value of an instance in the cluster is to metric values of other instances in the cluster compared to metric values of instances in other clusters. The silhouette coefficient can range from −1 to +1, wherein a high value for an instance indicates that the instance is well matched to other instances in its own cluster and poorly matched to instances in neighboring clusters. If most instances have a high value, then the clustering configuration is deemed suitable. If many instances have a low or negative value for a silhouette coefficient, then the clustering configuration may have too many or too few clusters.

In some implementations, a configuration with a number of clusters that yields the highest silhouette coefficient for instances is selected as an optimal configuration of clusters. In some implementations, the first configuration that meets a predetermined threshold of silhouette coefficient may be selected. An analysis of the clusters thus formed is undertaken. In some implementations, historical values of the metric may be utilized to validate the instance values.

FIG. 8 depicts an illustrative example configuration of instances that have been clustered into 5 clusters based on their metric values.

As can be seen, there are two large clusters, cluster 825 and cluster 835 of instances, and relatively smaller clusters, cluster 820, cluster 830, and cluster 840.

Per techniques of this disclosure, clusters with a large number of instances are deemed normal. In some implementations, clusters with a number of instances that meet a deemed predetermined threshold (measured as a percentage/ratio of total number of instances) are deemed to be clusters with normally operating instances. In this illustrative example, cluster 825 and cluster 835 are considered to be clusters with normally operating instances. Normally operating instances are excluded from consideration as outlier instances.

Clusters of instances where the instance values (average value of instances in cluster, centroid value for cluster, etc.) lie between normally operating instances are considered to be migratory clusters, e.g., clusters of instances that are in the process of changing a state (of metric value) from one cluster to another. In this illustrative example, cluster 830 includes instances with metric values that lie between the metric values of instances in cluster 825 and cluster 835 and is therefore considered to be a migratory cluster. Instances that are located in migratory clusters are excluded from consideration as outlier instances.

Clusters that have a relatively small number of instances, e.g., clusters with a number below a predetermined threshold ratio (or percentage of total instances), and that are not migratory clusters are considered 'lonely' clusters are considered as candidate outlier clusters. In this illustrative example, cluster 820 (with just a single instance) and cluster 840 (with two instances) are considered candidate outlier clusters, and the corresponding instances are considered candidate outlier instances. Such candidate outlier clusters may typically be located towards extremities of a range of metric values.

Figure 9:
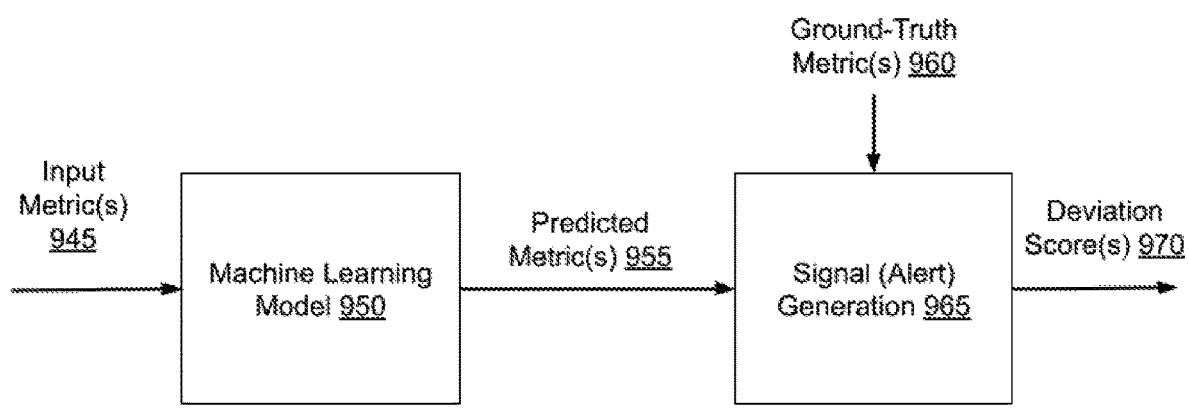
FIG. 9 is a block diagram that depicts determination of a load based anomaly detection score, in accordance with some implementations.

FIG. 9 is a block diagram that depicts determination of a load (traffic) based anomaly detection score, in accordance with some implementations.

Load based outliers may be determined by verifying that application-level metrics for an application are commensurate with a load or traffic that is being handled by the application. For example, it may be determined whether a relatively high value for one or more metrics for an application, e.g., CPU utilization, is caused mainly by high levels of traffic, e.g., a long weekend holiday for an application serving streaming content to users, high shopping days such as Black Friday for an ecommerce application, etc.

For each application being monitored, corresponding input metrics are determined. This may vary from application to application, and may include metrics such as user traffic, incoming requests, etc. Input metrics may be auto-detected or may be specified by a user, monitoring system, etc., or may be auto detected by the cloud management system based on an analysis of time-series data for different metrics, and a determination of which metrics of a set of metrics are largely driven by external factors.

For each application being monitored, input metric data 945 for one or more input metrics is provided to a trained machine learning (ML) model 950. As described earlier, a current value of the input metric(s) may be determined by adjusting for any time-delays in received time-series data of the input metric(s).

Based on the provided input metric(s), the ML model generates a predicted metric value 955 for one or more metrics for that application. In some implementations, a time-series prediction technique may be utilized by the ML model for estimating the metrics. The one or more metrics can include multiple metrics that are monitored for the application, and can include primary metrics, secondary metrics, value metrics, etc.

The predicted metric values for the one or more metrics are compared to actual metric values (ground-truth metrics) 960 at a signal (alert) generation module 965. Based on the comparison, one or more deviation score(s) 970 and/or severity scores are generated based on a relative normalized deviation of the predicted and ground-truth metric values. The normalization may be performed based on a determined standard deviation or variation observed for the corresponding metric(s). Other meta-data may also be determined by the ML model and provided to the alert generation module.

The ground truth metric values and input metric values are associated with a post release time period, e.g., a second time period or a third time period, whereas the predicted metric values are based on a pre-release ML and/or mathematical model.

Figure 10:
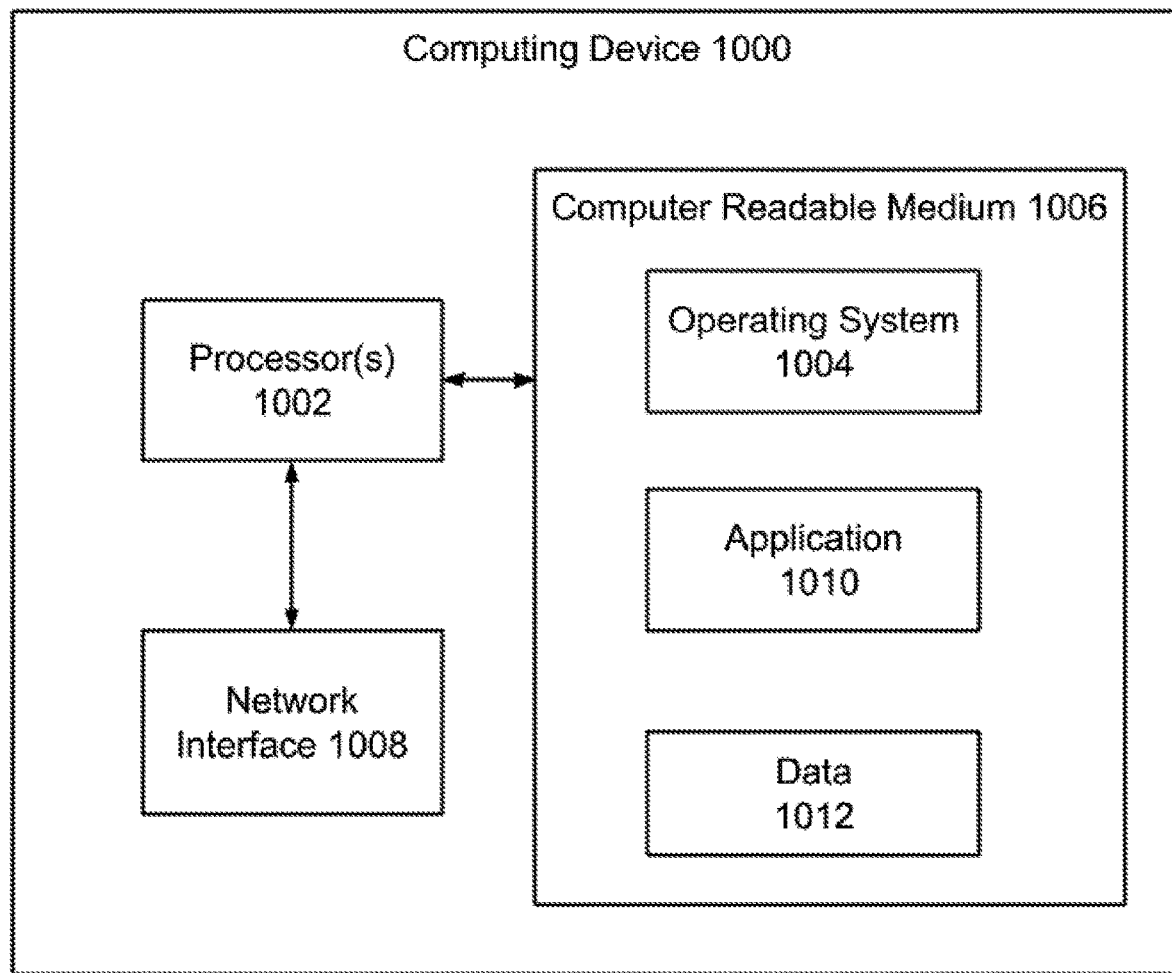
FIG. 10 is a block diagram illustrating an example computing device, in accordance with some implementations.

FIG. 10 is a block diagram of an example computing device 1000 which may be used to implement one or more features described herein. In one example, device 1000 may be used to implement a computer device (e.g., 110, 130, 140, 150, and/or 160 of FIG. 1), and perform appropriate method implementations described herein. Computing device 1000 can be any suitable computer system, server, or other electronic or hardware device. For example, the computing device 1000 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, device 1000 includes a processor 1002, a memory 1004, input/output (I/O) interface 1006, and audio/video input/output devices 1014.

Processor 1002 can be one or more processors and/or processing circuits to execute program code and control basic operations of the device 1000. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Computer readable medium (memory) 1006 is typically provided in device 1000 for access by the processor 1002, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 1002 and/or integrated therewith. Memory 1004 can store software operating on the server device 1000 by the processor 1002, including an operating system 1004, one or more applications 1010 and application data 1012. In some implementations, application 1010 can include instructions that enable processor 1002 to perform the functions (or control the functions of) described herein, e.g., some or all of the methods described with respect to FIG. 5.

Elements of software in memory 1006 can alternatively be stored on any other suitable storage location or computer-readable medium. In addition, memory 1006 (and/or other connected storage device(s)) can store instructions and data used in the features described herein. Memory 1006 and any other type of storage (magnetic disk, optical disk, magnetic tape, or other tangible media) can be considered "storage" or "storage devices."

An I/O interface can provide functions to enable interfacing the server device 1000 with other systems and devices. For example, network communication devices, storage devices (e.g., memory and/or data store 1012), and input/output devices can communicate via the interface. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices can include a user input device (e.g., a mouse, etc.) that can be used to receive user input, a display device (e.g., screen, monitor, etc.) and/or a combined input and display device, that can be used to provide graphical and/or visual output.

For ease of illustration, FIG. 10 shows one block for each of processor 1002, memory 1006. These blocks may represent one or more processors or processing circuitries, operating systems, memories, I/O interfaces, applications, and/or software engines. In other implementations, device 1000 may not have all of the components shown and/or may have other elements including other types of elements instead of, or in addition to, those shown herein. While the processing system 130 is described as performing operations as described in some implementations herein, any suitable component or combination of components of processing system 130 or similar system, or any suitable processor or processors associated with such a system, may perform the operations described.

A user device can also implement and/or be used with features described herein. Example user devices can be computer devices including some similar components as the device 1000, e.g., processor(s) 1002, memory 1006, etc. An operating system, software and applications suitable for the client device can be provided in memory and used by the processor. The I/O interface for a client device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video input/output devices, for example, can be connected to (or included in) the device 1000 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., method 500) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g., Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating systems.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative. Concepts illustrated in the examples may be applied to other examples and implementations.

The functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method to provide an alert for a release of a software application implemented in a distributed computing system, comprising:
providing a cloud management system that is coupled via a network to the distributed computing system and a cloud monitoring system;
monitoring, by a machine agent, running instances of the software application;
automatically detecting, during the monitoring of the running instances of the software application by the machine agent, the release of the software application;
obtaining, by querying a time-series database server included with one of: the distributed computing system and the cloud monitoring system, after the release of the software application, a first set of metric values for a first time period preceding a time of the release of the software application, wherein the first set of metric values includes pre-release metric values for a plurality of metrics associated with the software application;
obtaining, by querying the time-series database server included with one of: the distributed computing system and the cloud monitoring system, subsequent to the release of the software application, a second set of metric values for a second time period following the time of the release of the software application, wherein the second set of metric values includes post-release metric values for the plurality of metrics associated with the software application, and wherein the second set of metrics includes at least one traffic volume metric;
predicting a state of one or more metrics included in the plurality of metrics for the second time period, wherein the predicting is based on the first set of metric values for the first time period and the at least one traffic volume metric;
determining a current state of the one or more metrics for the second time period based on the second set of metric values;
determining a deviation score based on a difference between the predicted state of the one or more metrics and the respective current state of the one or more metrics; and
based on the deviation score, performing, by the cloud management system, an action that includes one or more of: generating and transmitting an alert via one or more of: a user interface and a communication channel and performing, by the cloud management system, an auto-remediation action, wherein the auto-remediation action includes rolling back the release of the software application.

2. The computer-implemented method of claim 1, wherein predicting the state of the one or more metrics comprises predicting the state of the one or more metrics based on a plurality of previous states of the one or more metrics for the first time period.

3. The computer-implemented method of claim 1, wherein obtaining the first set of metric values comprises obtaining time-series data associated with the software application via a pull model, and wherein an initial request is originated from the cloud management system that is responded to by the time-series database server.

4. The computer-implemented method of claim 3, wherein obtaining the time-series data comprises querying a database at a periodic interval.

5. The computer-implemented method of claim 1, further comprising receiving a notification of the release of the software application from a release management system.

6. The computer-implemented method of claim 1, further comprising determining a duration of the first time period based on statistical properties of the one or more metrics.

7. The computer-implemented method of claim 1, wherein determining the predicted state of the one or more metrics further comprises applying a time series forecasting model based on a plurality of previous states of each of the one or more metrics from the first time period.

8. The computer-implemented method of claim 7, wherein applying the time series forecasting model comprises applying an autoregressive integrated moving average (ARIMA) model, and wherein a number of the plurality of previous states is between about 3 previous states and about 20 previous states.

9. The computer-implemented method of claim 1, wherein determining the deviation score comprises determining a first deviation score of a first metric and a second deviation score of a second metric.

10. The computer-implemented method of claim 9, further comprising determining a composite deviation score based on a weighted combination of the first deviation score and the second deviation score.

11. The computer-implemented method of claim 1, further comprising performing release analysis to determine dependencies of the software application during the first time period and the second time period.

12. The computer-implemented method of claim 11, further comprising transmitting one of a notification or an alert that includes results of the release analysis.

13. A non-transitory computer-readable medium comprising instructions that, responsive to execution by a processing device, causes the processing device to perform operations comprising:
configuring a cloud management system that is coupled via a network to a distributed computing system and a cloud monitoring system to provide an alert for a release of a software application implemented in the distributed computing system;
monitoring, by a machine agent, running instances of the software application;
automatically detecting, during the monitoring of the running instances of the software application by the machine agent, the release of the software application;
obtaining, by querying a time-series database server included with one of: the distributed computing system and the cloud monitoring system, subsequent to the release of the software application, a first set of metric values for a first time period preceding a time of the release of the software application, wherein the first set of metric values includes pre-release metric values for a plurality of metrics associated with the software application;
obtaining, by querying the time-series database server included with one of: the distributed computing system and the cloud monitoring system, subsequent to the release of the software application, a second set of metric values for a second time period following the time of the release of the software application, wherein the second set of metric values includes post-release metric values for the plurality of metrics associated with the software application, and wherein the second set of metrics includes at least one traffic volume metric;

predicting a state of one or more metrics included in the plurality of metrics for the second time period, wherein the predicting is based on the first set of metric values for the first time period and the at least one traffic volume metric;

determining a current state of the one or more metrics for the second time period based on the second set of metric values;

determining a deviation score based on a difference between the predicted state of the one or more metrics and the respective current state of the one or more metrics; and based on the deviation score, performing, by the cloud management system, an action that includes one or more of: generating and transmitting an alert via one or more of: a user interface and a communication channel and performing, by the cloud management system, an auto-remediation action, wherein the auto-remediation action includes rolling back the release of the software application.

14. The non-transitory computer-readable medium of claim 13, wherein predicting the state of the one or more metrics comprises predicting the state of the one or more metrics based on a plurality of previous states of the one or more metrics for the first time period.

15. A system comprising:
a memory with instructions stored thereon; and
a processor, coupled to the memory, the processor configured to access the memory and execute the instructions, wherein the instructions cause the processor to perform operations including:
configuring a cloud management system that is coupled via a network to a distributed computing system and a cloud monitoring system to provide an alert for a release of a software application implemented in the distributed computing system;
monitoring, by a machine agent, running instances of the software application;
automatically detecting, during the monitoring of the running instances of the software application by the machine agent, the release of the software application;
obtaining, by querying a time-series database server included with one of: the distributed computing system and the cloud monitoring system, subsequent to the release of the software application, a first set of metric values for a first time period preceding a time of the release of the software application, wherein the first set of metric values includes pre-release metric values for a plurality of metrics associated with the software application;

obtaining, by querying the time-series database server included with one of: the distributed computing system and the cloud monitoring system, subsequent to the release of the software application, a second set of metric values for a second time period following the time of the release of the software application, wherein the second set of metric values includes post-release metric values for the plurality of metrics associated with the software application, and wherein the second set of metrics includes at least one traffic volume metric;

predicting a state of one or more metrics included in the plurality of metrics for the second time period, wherein the predicting is based on the first set of metric values for the first time period and the at least one traffic volume metric;

determining a current state of the one or more metrics for the second time period based on the second set of metric values;

determining a deviation score based on a difference between the predicted state of the one or more metrics and the respective current state of the one or more metrics; and based on the deviation score, performing, by the cloud management system, an action that includes one or more of: generating and transmitting an alert one or more of: a user interface and a communication channel and performing, by the cloud management system, an auto-remediation action, wherein the auto-remediation action includes rolling back the release of the software application.

16. The system of claim 15, wherein the operations further comprise obtaining a third set of metric values for a third time period that corresponds to a period of high traffic following the time of the release of the software application.

17. The system of claim 16, wherein obtaining the third set of metric values for the third time period comprises obtaining data for the third time period based on a determination that a traffic metric for the third time period meets a predetermined threshold.

18. The system of claim 15, wherein obtaining the second set of metric values for the second time period comprises obtaining the second set of metric values for the second time period for a time period that commences following a predetermined time after the time of the release of the software application.

* * * * *